US012373584B2

(12) United States Patent
Joshi et al.

(10) Patent No.: US 12,373,584 B2
(45) Date of Patent: Jul. 29, 2025

(54) SYSTEMS AND METHODS FOR SECURING DATA BASED ON DISCOVERED RELATIONSHIPS

(71) Applicant: Oracle International Corporation, Redwood Shores, CA (US)

(72) Inventors: Vijay Simha Joshi, Karnataka (IN); Hozefa Yusuf Palitanawala, Foster City, CA (US); Pallab Rath, Bangalore (IN); Bharat Shrikrishna Paliwal, Fremont, CA (US); John Chaitanya Kati, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 70 days.

(21) Appl. No.: 18/358,130

(22) Filed: Jul. 25, 2023

(65) Prior Publication Data
US 2023/0367891 A1 Nov. 16, 2023

Related U.S. Application Data

(63) Continuation of application No. 16/449,166, filed on Jun. 21, 2019, now Pat. No. 11,755,754.
(Continued)

(51) Int. Cl.
*G06F 21/62* (2013.01)
*G06F 16/2455* (2019.01)
*G06N 20/00* (2019.01)

(52) U.S. Cl.
CPC .......... *G06F 21/62* (2013.01); *G06F 16/2456* (2019.01); *G06N 20/00* (2019.01)

(58) Field of Classification Search
CPC .. G06F 21/62; G06F 16/2456; G06F 21/6245; G06N 20/00
See application file for complete search history.

(56) References Cited

U.S. PATENT DOCUMENTS 8,930,368 B2 * 1/2015 Furuichi ............... G06F 16/353
726/16
11,074,362 B2 * 7/2021 Conikee ............... G06F 21/577
(Continued)

OTHER PUBLICATIONS

Foreign Key Discovery, available onlie at <https://network.informatica.com/onlinehelp/analyst/961/en/index.htm#/page/data-discovery-guide/GUID-33EAF039-ECFC-49FD-96F4-A2C2A4EB857F.1.148.html>, 2 pages.
(Continued)

*Primary Examiner* — Khalid M Almaghayreh
(74) *Attorney, Agent, or Firm* — Invoke

(57) ABSTRACT

Techniques for automatically discovering and protecting sensitive data are disclosed. In some embodiments, a set of data objects is searched for data matching a first set of one or more regular expressions and for metadata matching a second set of one or more regular expressions. A confidence score is then generated for a particular data objects in the set of data objects as a function of regular expressions in the first set of one or more regular expressions that match data stored in the particular data object and regular expression in the second set of one or more regular expressions that match metadata associated with the particular data object. One or more operations may be performed to protect sensitive data stored in the particular data object based, at least in part, on the confidence score.

20 Claims, 10 Drawing Sheets

Related U.S. Application Data

(60) Provisional application No. 62/748,271, filed on Oct. 19, 2018.

(56) References Cited

U.S. PATENT DOCUMENTS

| | | | | |
|---|---|---|---|---|
| 11,500,880 | B2* | 11/2022 | Murray | G06F 16/215 |
| 2005/0055369 | A1* | 3/2005 | Gorelik | G06F 16/00 |
| | | | | 707/999.102 |
| 2006/0095466 | A1* | 5/2006 | Stevens | G06F 16/2445 |
| 2011/0173149 | A1* | 7/2011 | Schon | G06F 16/24564 |
| | | | | 706/48 |
| 2013/0311456 | A1* | 11/2013 | Winkler | G06F 16/24578 |
| | | | | 707/723 |
| 2017/0242876 | A1* | 8/2017 | Dubost | G06F 16/2365 |
| 2017/0264619 | A1* | 9/2017 | Narayanaswamy | |
| | | | | G06F 21/6209 |
| 2018/0075104 | A1* | 3/2018 | Oberbreckling | G06F 16/254 |
| 2018/0075115 | A1* | 3/2018 | Murray | G06F 16/248 |
| 2018/0330114 | A1* | 11/2018 | McGrath | G06F 16/2282 |
| 2019/0095481 | A1* | 3/2019 | Lindhorst | G06F 16/2228 |
| 2019/0102438 | A1* | 4/2019 | Murray | G06F 40/109 |
| 2019/0114354 | A1* | 4/2019 | Orun | G06F 16/24578 |
| 2019/0260787 | A1* | 8/2019 | Zou | G06N 3/08 |
| 2019/0370688 | A1* | 12/2019 | Patel | H04L 9/3231 |
| 2020/0034473 | A1* | 1/2020 | Rushan | G06F 16/2379 |
| 2020/0097587 | A1* | 3/2020 | Klein | G06F 16/2462 |
| 2020/0177637 | A1* | 6/2020 | Narayanaswamy | H04L 63/104 |
| 2020/0410116 | A1* | 12/2020 | Williamson | G06N 20/00 |
| 2021/0026992 | A1* | 1/2021 | Atreya | G06F 21/10 |

OTHER PUBLICATIONS

Informatica Persistent Data Masking and Data Subset User Guide (Version 9.5.0), Informatica., Part No. TDM-USG-95000-0001, Dec. 2012, 123 pages.

Jones et al., "Find Missing FK Constraints and Fixing them," available online at <https://www.sqlservercentral.com/Forums/Topic1650014-2824-1.aspx>, Jan. 9, 2015, 12 pages.

Rostin et al., "A Machine Learning Approach to Foreign Key Discovery," 12th International Workshop on the Web and Databases (WebDB 2009), 6 pages.

* cited by examiner

```
"sensitiveSchemas": [
  {
    "name": "HR",
    "sensitiveTableCount": 3,
    "unProtectedDataCount": 3,
    "sensitiveDataCount": 3,
    "sensitiveTables": [
      {
        "name": "IRELAND_NATIONAL_ID",
        "schema": "HR",
        "sensitiveDataCount": 1,
        "unProtectedDataCount": 1,
        "sensitiveDataList": [
          {
            "columnName": "NATIONAL_ID",
            "confidenceLevel": 1,
            "sensitiveType": "IDENTITY_NUMBER"                  DATA regex match against the column data          1 Point
          }                                                                                        Confidence Level: 1 Point
        ]
      },
      {
        "name": "US_ITIN",
        "schema": "HR",
        "sensitiveDataCount": 1,
        "unProtectedDataCount": 1,
        "sensitiveDataList": [
          {
            "columnName": "TIN_NO",                             Generic DATA regex match against the column data    1 Point
            "confidenceLevel": 5,                               Specific DATA regex match against the column data   1 Point
            "sensitiveType": "US_TAXPAYER_ID"                   METDATA regex match against the column metadata     3 Point
          }                                                                                        Confidence Level: 5 Points
        ]
      },
      {
        "name": "EMP_RETIRED",
        "schema": "HR",
        "sensitiveDataCount": 1,
        "unProtectedDataCount": 1,
        "sensitiveDataList": [
          {
            "columnName": "SSN",                                Generic DATA regex match against the column data    1 Point
            "confidenceLevel": 4,                               Specific DATA regex match against the column data   1 Point
            "sensitiveType": "USA_SSN"                          METDATA regex match against the column metadata     2 Point
          }                                                                                        Confidence Level: 4 Points
        ]
      }
    ]
  }
]
```

FIG. 3B

SYSTEMS AND METHODS FOR SECURING DATA BASED ON DISCOVERED RELATIONSHIPS

INCORPORATION BY REFERENCE; DISCLAIMER

Each of the following applications are hereby incorporated by reference: application Ser. No. 16/449,1666 filed on Jun. 21, 2019; application 62/748,271, filed Oct. 19, 2018. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to data security. In particular, the present disclosure relates to systems and methods for providing automatic discovery, machine-learning, and protection of sensitive data.

BACKGROUND

Data security is an important aspect of most cloud and enterprise systems. Data breaches may result in compromised data integrity, legal liability, exposure of confidential information to unauthorized entities, and revenue loss. Most enterprises and cloud providers have security policies to help protect against data breaches. However, in complex environments, sensitive information may be migrated, displaced, uploaded, or otherwise stored, through malicious or careless behavior, in unexpected locations.

Losing track of sensitive data may increase the vulnerability of a system to data breaches. For example, a cloud provider may neglect to apply appropriate security updates to a storage server where sensitive data was unexpectedly migrated, increasing the risk of security violations. As another example, a system administrator may inadvertently migrate files to an unsecured location, unaware that the files contain sensitive data. Thus, a failure to properly account for the storage location of sensitive data may compromise the security of the data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3B illustrates an example sensitive data evaluation result based on a sensitive type definition in accordance with some embodiments;

DETAILED DESCRIPTION

Figure 1:
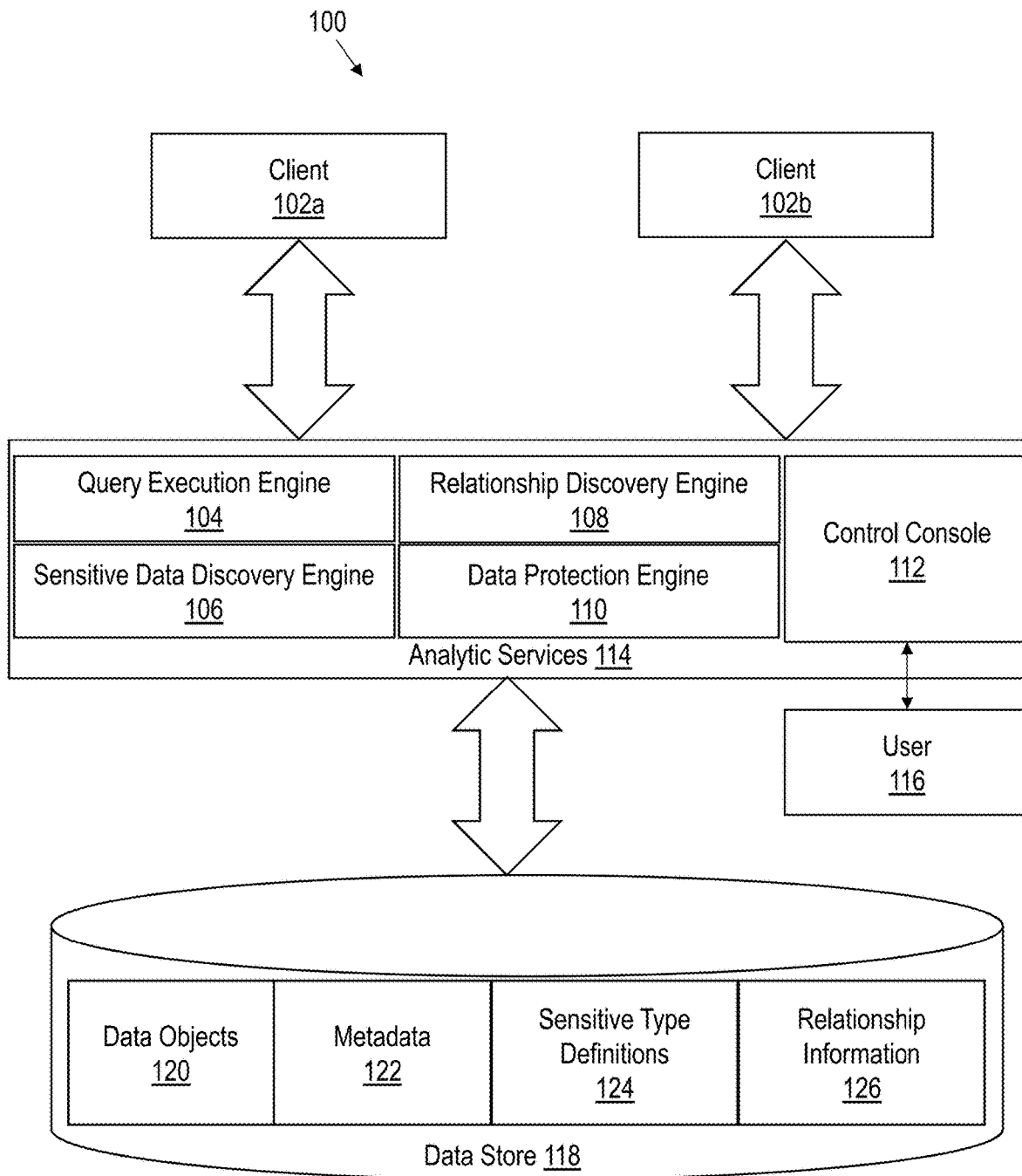
FIG. 1 illustrates a system in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. AUTOMATIC DISCOVERY OF SENSITIVE DATA
   3.1 DATA AND METADATA REGEXES
   3.2 HIERARCHICAL REGEXES
   3.3 CONTEXTUAL INFORMATION
   3.4 SECURITY CONTROLS
   3.5 EVALUATION PROCESS FOR DATA SENSITIVITY AND CONFIDENCE SCORES
   3.6 SENSITIVE TYPE DEFINITIONS
   3.7 EXAMPLE IMPLEMENTATION
4. DATA SECURITY OPERATIONS
   4.1 PROTECTIVE MEASURES BY CONFIDENCE LEVEL
   4.2 EXAMPLE SECURITY OPERATIONS
5. AUTOMATIC RELATIONSHIP DISCOVERY
   5.1 DISCOVERY PARAMETERS AND CONFIGURATION SETTINGS
   5.2 NAME MATCHING
   5.3 DATA MATCHING
   5.4 MINING REAL APPLICATION WORKLOADS
   5.5 MINING WORKLOAD REPOSITORIES
   5.6 ACCESS PATTERN ANALYTICS AND MACHINE LEARNING
6. DATA SECURITY BASED ON LEARNED RELATIONSHIPS
   6.1 PRESENTING LEARNED RELATIONSHIPS TO APPLICATION USERS
   6.2 PROPAGATING SECURITY OPERATIONS BASED ON LEARNED RELATIONSHIPS
7. COMPUTER NETWORKS AND CLOUD NETWORKS
8. MICROSERVICE APPLICATIONS
9. HARDWARE OVERVIEW
10. MISCELLANEOUS; EXTENSIONS

1. General Overview

Techniques for automatically discovering and protecting sensitive data are disclosed. In some embodiments, sensitive data is detected by searching for data and/or metadata that match a set of regular expressions. A regular expression, also referred to as a regex, is a string or sequence of characters that specify patterns to search for in a set of data objects. A given data object may be classified as sensitive or not sensitive depending, at least in part, on whether any of the specified patterns are detected in the data object and/or in metadata associated with the data object.

In some embodiments, a sensitive data discovery process generates a confidence score reflecting a level of confidence that a data object includes sensitive data. The confidence score may be generated, in whole or part, as a function of regular expressions in a first set of one or more regular expressions that match data stored in the particular data object and/or regular expressions in a second set of one or more regular expressions that match metadata associated with the particular data object. Confidence scores help improve the robustness and reliability of automated discovery systems. For example, a regex for detecting credit numbers may search for 16-digit numbers. If a data object includes a 16-digit number, then there is a risk that the data object is storing sensitive credit card information. However, the confidence level may be relatively low as the 16-digit number may represent an order number or some other identifier. The confidence level may be increased if other regex matches are detected. For instance, if a metadata associated with the data object matches a metadata regex indicative of sensitive credit information, then the confidence level may be increased to reflect a higher probability that the data object stores sensitive data. On the other hand, if the metadata matches a metadata regex indicative of order identifiers, then the confidence level may be decreased.

Additionally or alternatively, confidence scores may account for other factors that are indicative of data sensitivity. Examples include, but are not limited to, data access patterns, contextual information about data objects that may or may not be captured in the data object's metadata, and security policies applied to the data object. Thus, a confidence score may be generated as a function of multiple factors, which may help reduce false positives and/or false negatives when classifying data objects as sensitive.

In some embodiments, different factors are assigned weights to reflect how the factor, if present in or otherwise detected with respect to a data object, affects the confidence score. Some factors may be weighted more heavily than other factors to reflect a greater impact on the confidence level. For example, a regex that detects the pattern "(?i) CREDIT.*CARD.*NUMBER.*" may be weighted more heavily than a regex pattern that matches "regex":"(?i) card.*number.*". As another example, certain access patterns may be weighted based on how predictive the access pattern is that the underlying data is sensitive. In some cases, default weights may be assigned and/or automatically learned based on how likely a regex match is indicative of sensitive data. Additionally or alternatively, the weights may be exposed to and configurable by an end user.

In some embodiments, data security operations may be performed based on the confidence scores assigned to data objects. Example data security operation may include, but are not limited to, compliance checks, data masks, data redaction, encryption, subsetting, and data deletion. One or more operations may be automatically triggered against a data object if there is a high level of confidence that the data object stores sensitive data. If the confidence level is less than a threshold, then a user may be prompted to determine whether the data protection operation should proceed. Other actions/operation may also be triggered as a function of confidence scores, depending on the particular implementation.

Techniques for automatically discovering relationships between data to enforce data security are also disclosed. In some embodiments, a query analytic system receives at least one query that accesses data from a set of data objects and is generated by an application to accomplish an application-level function that is opaque to the query analytic system. The query analytic system may analyze the at least one query for storage and/or access patterns that are indicative that a first object storing sensitive data is related to a second object. The access patterns may include any application behavior, as determined from submitted queries, or query semantics of the submitted queries that are predictive of a relationship. Example access patterns may include, but are not limited to, defining/accessing database objects with substantially matching names, defining/accessing database objects with substantially overlapping data, recurring joins of different database objects, recurring substitutions of one database object with another in submitted queries, and/or the range of values that are stored in the data objects. One or more patterns that are predictive that a sensitive relationship is present may be learned through machine-learning models, as described further herein.

In some embodiments, when a relationship between two objects is detected, the query analytic system stores an indication of the relationship even though there may be no explicitly defined relationship within the database. An operation that is performed against the one object may also be performed against one or more related objects based on the stored indication. For example, security measures applied to a first object to protect the sensitive data stored therein may be propagated to a second object that is linked via the stored indication of the discovered relationship. Thus, the system may automatically extend security measures based on learned relationships. Additionally or alternatively, information about the second object may be displayed when information about related objects is requested for the first object.

Embodiments may be implemented independently from or in combination with other embodiments described herein. For example, the techniques for automatically detecting sensitive data may be combined with the techniques for automatically discovering relationships between data objects to bolster data security in a cloud or other network environment. In other cases, the techniques may be implemented independently from one another.

One or more embodiments described in this Specification and/or recited in the claims may not be included in this General Overview section.

2. System Architecture

FIG. 1 illustrates system 100 in accordance with some embodiments. As illustrated in FIG. 1, system 100 includes clients 102a-b, analytic services 114, and data store 118. System 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Clients 102*a-b* comprise hardware and/or software that accesses one or more of analytic services 114. For example, clients 102*a-b* may be applications that submit database queries, hypertext transfer protocol (HTTP) messages, and/or other requests conforming to one or more other communication protocols. Responsive to the requests, one or more of analytic services 114 may be invoked to generate a response, which may be returned to the requesting client.

Analytic services 114 may comprise query execution engine 104, sensitive data discovery engine (SDDE) 106, relationship discovery engine (RDE) 108, data protection engine (DPE) 110 and/or control console 112. In some embodiments, one or more of these services are implemented on a storage system, such as a database management system (DBMS) or a filesystem. Additionally or alternatively, one or more of analytic services 114 may be implemented in a cloud service, such as a database-as-a-cloud service (DBaaS), platform-as-a-service (PaaS), or software-as-a-service (SaaS). Additional embodiments and examples relating to computer networks are described below in Section 7, titled "Computer Networks and Cloud Networks." Additionally or alternatively, one or more of analytic services 114 may be implemented as a microservice. Additional embodiments and examples relating to microservice applications are described below in Section 8, titled "Microservice Applications."

Query execution engine 104 is configured to receive and evaluate queries in accordance with some embodiments. Query execution engine 104 may compile a query to generate a query execution plan. Additionally or alternatively, query execution engine 104 may optimize the query execution plan and/or execute the query execution plan to generate a query result. In some embodiments, query execution engine 104 is configured to compile and execute structured query language (SQL) commands and/or expressions. Additionally or alternatively, query execution engine 104 may be configured to evaluate and execute queries that conform to other structured and/or unstructured formats.

SDDE 106 is configured to analyze and classify data objects that include sensitive data. Sensitive data may include, but is not limited to, personal credit information (PCI), personal identifying information (PII), personal health information (PHI), trade secrets, and/or other confidential information. Additional embodiments and examples for automatic discovery and classification of sensitive data is described below in Section 3, titled "Automatic Discovery of Sensitive Data."

RDE 108 is configured to identify relationships between data objects that may affect the security of the data. For example, RDE 108 may identify primary-foreign key relationships that are not explicitly defined within a database dictionary or schema and/or other access patterns. Additional embodiments and examples for automatically discovering data relationships are described below in Section 5, titled "Automatic Relationship Discovery."

Data protection engine 110 is configured to apply operations to enforce data security based on discovered relationship and/or sensitivity data. For example, data protection engine 110 may receive output from SDDE 106 and/or relationship discovery engine 108 indicative of sensitive data and/or relationships. In response, data protection engine 110 may trigger one or more operations, such as compliance checks, data masking, data redaction, data removal, subsetting, migration and/or encryption to help enforce data security. The operations that are performed may be specified in security policies, rules, programmatic logic, and/or through other means, depending on the particular implementation. Additional embodiments and examples for performing operations for protecting sensitive data are described in Section 4, titled "Data Security Operations", and Section 6, titled "Data Security Based on Learned Relationships."

In some embodiments, control console 112 refers to hardware and/or software configured to facilitate communications between user 116 and analytic services 114. Control console 112 renders user interface elements and receives input via user interface elements. Examples of interfaces include a graphical user interface (GUI), an application programming interface (API) a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. User 116 may be a human user, such as an administrator, or an application.

In some embodiments, different components of control console 112 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, control console 112 is specified in one or more other languages, such as Java, C, or C++.

In some embodiments, data store 118 is any type of storage unit and/or device (e.g., a file system, database, collection of tables, or any other storage mechanism) for storing data. Further, data store 118 may include multiple different storage units and/or devices. The multiple different storage units and/or devices may or may not be of the same type or located at the same physical site. Further, data store 118 may be implemented or may execute on the same computing system as one or more analytic services 114. Alternatively or additionally, data store 118 may be implemented or executed on a computing system separate from one or more analytic services 114. Data store 118 may be communicatively coupled to analytic services 114 via a direct connection or via a network.

In some embodiments, data store 118 stores data objects 120, metadata 122, sensitive type definitions 124, and relationship information 126. Data objects 120 may include, but is not limited to, datafiles, tables, columns, views, arrays, and/or other data structures/database objects for storing user and/or application data. Metadata 122 stores data that provides information about data objects 120, such as when the data was created, the size of the data, how the data is structured, what data types are stored by the data object, and how the data was created. Sensitive type definitions 124 may define regexes and/or other factors used in the automatic discovery of sensitive information. Relationship information 126 may store indications of learned relationships between data objects 120, such as primary-foreign key relationships.

In some embodiments, the components of system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Automatic Discovery of Sensitive Data

3.1 Data and Metadata Regexes

In some embodiments, SDDE 106 is configured to automatically search for and discover data using a set of data and/or metadata regexes. As previously mentioned, a regex is a string or other sequence of characters that defines a pattern for which to search. In the present context, regexes may define predefined and/or learned patterns that are indicative of sensitive data.

A regex may comprise metacharacters and/or literals. A metacharacter is an operator that specifies a search process or algorithm for matching data. For example, the metacharacter "." matches any character, the metacharacter "*" matches zero or more occurrences of the preceding subexpression (which may be a literal or another metacharacter), [ . . . ] matches any character in a list, {m, n} matches at least m, but not more than n occurrences of a preceding subexpression, and (?i) matches literal subexpressions in a case-insensitive manner. A literal is the actual character and/or sequence of characters to match. For example, "credit" may be used as a literal subexpression to search for occurrences of this term in data and/or metadata.

Regexes may comprise a combination of metacharacters and literals to search for sensitive data patterns. For example, the regex "(?i} credit*card" defines a case-insensitive search for credit card where zero or more characters occur between the literal subexpression "credit" and "card". Thus, the example regex matches, among other possible combinations, the following: "CREDITCARD", "Credit_Card", "credit (visa) card", etc.

In some embodiments, a data regex includes metacharacters and literals that specify search algorithms for detecting sensitive patterns in application and/or user data (e.g., raw data) that is stored in a set of data objects. For example, a data regex may define patterns for identifying personal credit information (PCI) (e.g., credit card numbers, social security numbers, etc.), personal identifying information (PII) (e.g., home addresses, email addresses, telephone numbers), personal health information (PHI) (e.g., medical histories/charts, doctor information, etc.), trade secrets (e.g., research and development notes, unpublished content, etc.), and/or other confidential information. SDDE 106 may execute the search patterns defined by a data regex to find matching content stored in data objects 120.

In some embodiments, a metadata regex includes metacharacters and literals that specify search algorithms for detecting metadata patterns indicative of data sensitivity. For example, a metadata regex may search for patterns in column/file names, metadata indicative of file formats (e.g., file extension names, data identifying whether a data object is encrypted or not, data identifying what encryption algorithms have been applied, data identifying specific datatypes, data identifying permissions/restrictions associated with accessing the data object), metadata indicative of the source of a data object (e.g., an application responsible for creating the data, a username associated with a user that created the data, a hostname for a device that is storing the data) and/or other metadata information for matching patterns. Sample data and metadata regexes are provided in the examples below.

In some embodiments, regexes are associated with weighted and/or unweighted confidence scores. SDDE 106 may assign an aggregate or total confidence score to a data object as a function of the data and/or metadata regexes that are matched against the data object. For example, a set of regexes for identifying social security numbers may include a data regex that searches for 9-digit numbers and metadata regexes "(?i)social*security" and "(?i)ssn.*" In an unweighted scenario, the aggregate score may be incremented by one for each regex match. Thus, if a data object has a column name "Social Security Number" and stores a 9-digit number, then the aggregate confidence score based on regex matching may be 2. In this example, the confidence score is indicative of how many regexes were matched against the data object.

In an example, using weighted scoring, the data 9-digit number may be ascribed a lower confidence score than the metadata regex ""(?i)social*security". For example, the data regex in this example may increment the aggregate score by 1, and the metadata regex may increment the aggregate confidence score by 2. The weights may be assigned based on a likelihood that a matched regex is indicative of sensitive data. In the present example, a 9-digit number may be an order identifier or a non-sensitive piece of information, as 9-digits numbers may be commonly used outside the context of social security numbers. The weights that are assigned to regexes may vary from implementation to implementation and may be configurable by a user. Additionally or alternatively, the weights may be determined through machine-learning, as described further below.

In some embodiments, regexes may be defined to decrement or otherwise reduce a confidence score. For example, in the example search for social security numbers, if a metadata regex "(?i)order*number" is matched against a column name for the data object, then the confidence score may be reduced. In this example, a match may reduce the likelihood that the data object stores social security numbers. Therefore, the confidence level may be reduced.

In some embodiments SDDE 106 may automatically learn sensitive patterns and generate corresponding regexes. For example, a training set of data may be received that includes a set of data objects that are labelled or otherwise identified as sensitive. The training set of data objects may store 16-digit numbers and include names such as "Credit_Card"; "CREDIT CARD NUMBER", "Visa Card Number", etc. SDDE 106 may analyze various attributes, such as whether there are overlapping literal expressions, whether the length of the data is consistent, and whether the format of the data is consistent. Based on the learned patterns, SDDE 106 may generate corresponding regexes. For example, the regexes "(?i)credit*.card" "(?i)card*number" may be generated based on the overlapping set of literal subexpressions learned from the training data. SDDE 106 may then use the automatically generated regexes to evaluate other data sets for sensitive information.

Additionally or alternatively, regexes may be defined by a domain expert and/or other users. A user may input domain knowledge about patterns followed by sensitive data within a particular environment. For example, unpublished and confidential files may follow particular patterns in naming conventions, encryption and/or formatting. The user may define a set of data and/or metadata regexes, which may be used by SDDE 106 to search for and detect sensitive data.

In some embodiments, SDDE 106 is configured to train machine-learning models for evaluating data objects using a set of regexes. In a supervised approach, SDDE 106 may train a machine-learning model may be based on user feedback or labels. For example, SDDE 106 may present a data object that matched one or more regexes to an end user and query the end user whether the data object should be labelled as sensitive. The end user may then label the data object sensitive or non-sensitive. Once enough labels have been submitted, SDDE 106 may determine weights associated with each regex based on how predictive the regex is that a data object stores sensitive data. Example machine learning algorithms that may be used to train the models may include, but are not limited to, random forests, support vector machines, artificial neural networks, decision trees, and/or other learning classification models. The model may be retrained or otherwise updated over time as more examples are labeled, allowing the model to become more accurate and adaptive to state changes.

3.2 Hierarchical Regexes

In some embodiments, SDDE 106 is configured to search for patterns that match one or more hierarchical regexes. A hierarchical regex, in this context, comprises two or more regexes that are related in an ordered manner. For example, a regex may be a parent node and/or a child node within the hierarchy. A parent node in the hierarchy may have one or more child nodes.

In some embodiments, a parent node in a hierarchy corresponds to a generic regex. Nodes that are children of the parent nodes are referred to as specific regexes. A generic regex defines a generic or broader pattern to search for in comparison to the child nodes. The specific regexes in the hierarchy may define more specific or narrower patterns for which to search. For example, a generic node in the hierarchy may define a regex as follows "(?i)credit.*number." A more specific regex in the hierarchy may define the regex "(?i)credit*card*number". As can be seen, the specific regex added the literal subexpression "card" in between two other subexpressions "credit" and "number" of the generic regex.

In some embodiments, a hierarchy may run multiple levels deep. For example, the specific regex "(?i)credit*card*number" may also be a parent to one or more child nodes, such as ""(?i)visa*.credit*card*number", ""(?i)AmEx*credit*card*number", etc.

Regex hierarchies allow for robust searching and classification of sensitive data patterns. A given data object may be assigned a confidence score as a function of which regexes in a hierarchy are matched to the data object. In some embodiments, the more regexes that are matched to a data object (or the deeper/more specific that the discovery process goes into the hierarchy) the higher the confidence score. For example, a data object that matches the generic regex "(?i)credit.*number.", but not the other specific regexes in the hierarchy may be assigned a score of "1". The score may be incremented for each additional specific regex that is matched to the data object.

Hierarchies may be defined with respect to data and/or metadata regexes. A top-level or parent node in the hierarchy may be referred to herein as a generic data/metadata regex. A child node may be referred to herein as a specific data/metadata regex.

In some embodiments, a hierarchical regex may be stored and/or represented as a tree structure or a directed graph comprising a set of nodes and edges. A top-level node in the tree structure may correspond to a generic regex. The top-level tree may be connected, via one or more edges, to other nodes corresponding to specific regexes at a second level within the hierarchy. Each node corresponding to a specific regex at the second level within the hierarchy may further be connected, via one or more edges, to other nodes representing specific regexes at a third level within the hierarchy. The number of levels within the hierarchy may vary depending on the particular implementation. SDDE 106 may traverse the tree structure during the evaluation process, described further below, to determine the search patterns to use when scanning data objects for sensitive data.

3.3 Contextual Information

In some embodiments, the confidence score for a data object factors in contextual information. Contextual information or a "context" refers to circumstances or attributes associated with a data object that are not necessarily stored in the data object's metadata or raw data. Example contextual information for a database object may include, but is not limited to table-level contexts, schema-level context, and database-level contexts. Additionally or alternatively, other contexts may be analyzed, depending on the particular implementation.

In some embodiments, SDDE 106 is configured analyze table-level contexts to determine whether table objects are likely storing sensitive information. SDDE 106 may analyze contextual information within a table by classifying columns based on regex matches within the column. For example, a given column may include values and/or metadata that match regex patterns indicative of credit card information. Based on the match, SDDE 106 may classify the column as potentially storing PCI data. Other classifications may include, but are not limited to PII, PHI, confidential company information, and trade secret information. The classifications may vary from implementation to implementation and may be configurable by a user.

If multiple columns from the same table share similar types of sensitive information, then SDDE 106 may increase the confidence score to reflect a higher likelihood that the data objects store sensitive data. For instance, in the previous example where SDDE 106 detects a column storing PCI information, SDDE 106 may detect that another column storing expiration dates was also classified as likely storing PCI data. In this event, SDDE 106 may increase the confidence scores for both columns as the table-level context is indicative that the columns are storing sensitive information since the classifications match. Similarly, SDDE 106 may increase the confidence scores when multiple table columns have been mapped to other sensitive groups, such as PII, PHI, etc.

In addition or as an alternative to table-level contexts, SDDE 106 may analyze other contexts. For example, SDDE 106 may determine whether objects in the same schema and/or database are mapped to the same sensitive group classifier. If so, then SDDE 106 may increase the confidence score associated with the objects. As another example, SDDE 106 may determine whether different files that are part of the same directory or sub-directory have been classified as belonging to the same sensitive group (e.g., PCI, PII, PHI, etc.) If so, then SDDE 106 may increment a confidence score associated with the corresponding files.

3.4 Security Controls

In some embodiments, the confidence score for a data object factors in security controls applied to the data object. Example security controls may include encryption, data redaction, identity and access management (IAM) policies, virtual private database (VPD) policies, and others. Security controls applied to a data object reinforce that the data object is sensitive. Thus, the confidence score may be incremented if matching security controls are detected.

In some embodiments, SDDE 106 is configured to analyze security policies applied to data objects for which there is a regex match. For example, if a particular column includes values or metadata that matches at least one regex, SDDE 106 may search policy files, column formatting information, and/or other data to determine whether any security policies have been applied to the column or table. SDDE 106 may search these sources and/or analyze the raw data to determine whether any of the data has been encrypted, redacted, protected, or otherwise secured.

In some embodiments, SDDE 106 increments the confidence score based on which security controls have been applied. For example, SDDE 106 may increment the confidence score for each security control that was detected. The score may be incremented in a weighted or unweighted manner, similar to described above. In other embodiments, SDDE 106 may implement a binary approach by incrementing the confidence score only once if any security controls are detected and leaving the confidence score the same if no security control have been applied. Thus, the manner in which the confidence score is adjusted may vary from implementation to implementation.

3.5 Evaluation Process for Data Sensitivity and Confidence Scores

Figure 2:
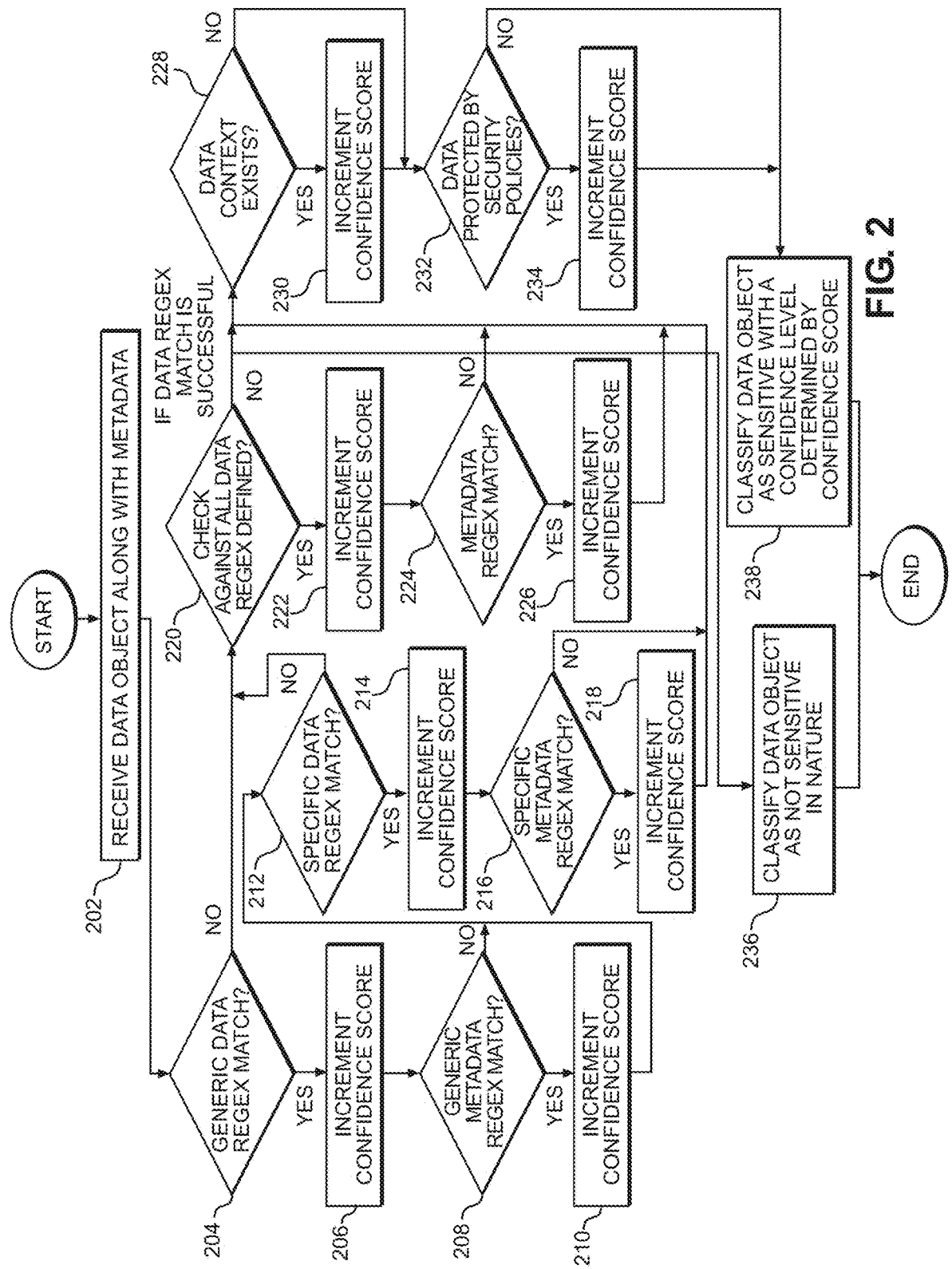
FIG. 2 illustrates an example set of operations for evaluating data sensitivity and generating confidence scores in accordance with some embodiments.

FIG. 2 illustrates an example set of operations for evaluating data sensitivity and
generating confidence scores in accordance with some embodiments. One or more of the steps may be omitted, repeated, and/or performed in a different order. Accordingly, the specific arrangement of steps shown in FIG. 2 should not be construed as limiting the scope of the embodiments.

SDDE 106 receives a data object along with metadata (operation 202). For example, a data object may be a file, table, column, view, or other data structure for storing or referencing data.

SDDE 106 next determines whether there is a generic data regex match (operation 204). For example, if searching for credit card numbers, then SDDE 106 may search for matches for generic credit card number formats, as defined by one or more data regexes, which may comprise a sequence of numbers 13-19 numbers long. Specific data regexes may narrow the search to specific types of credit card patterns, as mentioned further below. The data regexes that are matched at the operation may vary depending on the implementation and the type of sensitive data that is being targeted.

If the generic regex is matched, then SDDE 106 increments the confidence score for the data object (operation 206). In some embodiments SDDE 106 may increment the confidence score in an unweighted manner (e.g., by 1 for each match illustrated in the flow). In other embodiments, SDDE 106 may identify a weight associated with the matched regex and increment the score according to the weight.

SDDE 106 further determines if there is a generic metadata regex match (operation 208). For example, SDDE 106 may search for names, dates, format, data sources, and/or other metadata information using one or more metadata regexes as previously described. If a generic metadata regex is matched, then SDDE 106 increments the confidence score for the data object (operation 210). As previously mentioned the confidence score at this operation and the other similar operations in FIG. 2 may be adjusted in a weighted or unweighted manner.

SDDE 106 further searches for a specific data regex match (operation 212). As previously mentioned, a specific data regex may search for specific types of credit card patterns. For example, the data regex may search for predefined issuer identification numbers (IIN), which are typically included on the first six digits of a card number. In some cases, there may be no specific regexes used in the evaluation process, such as if no hierarchy is defined. In this case, this operation and the subsequent operations related to matching specific regexes may be omitted. If a specific data regex match is detected, then SDDE 106 increments the confidence score (operation 214).

SDDE 106 further searches for specific metadata regex matches (operation 216). If a specific metadata regex match is detected, then the confidence score is incremented (operation 218). The confidence score may be incremented in a weighted or unweighted matter as previously described.

If no generic and/or specific data regex matches are found, SDDE 106 determines whether to check against all data regexes defined (operation 220). In some implementations, there may be non-hierarchical regexes defined or a specific regex may still match even if the generic regex does not match. In these cases, SDDE 106 may attempt to match all or a subset of these data regexes. If a match is found, then SDDE 106 increments the confidence score (operation 222).

In some embodiments, SDDE 106 further checks if there is a metadata regex match (operation 224). If one is found, then the confidence score is incremented (operation 226).

SDDE 106 further determines whether a data context exists (operation 228). For example, SDDE 106 may determine whether multiple columns/data objects form the same table, schema or database have been mapped to the same category of sensitive information. If related data objects have been assigned to the same category (e.g., PCI, PHI, PII, credit card information, social security numbers, and/or other categories), then the confidence score is incremented (operation 230).

SDDE 106 further analyzes the data object to determine whether any security policies have been applied (operation 232). For example, SDDE 106 may search encryption policies/metadata, data redaction policies, VPD policies, etc., to determine whether they have been applied to the present data object being analyzed. If so, then the confidence score is incremented (operation 234).

If no data regexes (generic or specific) could be matched to the data object, then SDDE 106 classifies the data object as not sensitive in nature (operation 236). However, if at least one data regex could be matched, then the data object is classified as sensitive with a confidence level determined by the confidence score (operation 238).

3.6 Sensitive Type Definitions

In some embodiments, data store 118 stores sensitive type definitions 124. A sensitive type definition may define data and/or metadata regexes for a particular type of sensitive data. For example, a sensitive type definition for credit cards may define a series of data and/or metadata regexes that match credit card patterns. The sensitive type definition may further define the confidence scores and contexts/categories for the set of regexes. Additionally or alternatively, sensitive type definitions may be defined for other types of sensitive information, such as PHI, PII, etc. Each sensitive type definition may include different sets of regexes that are tailored to discovering sensitive data of a particular type.

In some embodiments, a sensitive type definition is stored in a structured format, such as JavaScript Object Notation (JSON) or extensible markup language (XML). The following is an example of a JSON sensitive type definition for searching for credit card numbers:

```
"sensitiveTypes": [
    {
        "id": "CREDIT_CARD",
        "classificationID": "PCI",
        "description": "cc",
        "metadataRegex": [
            {
                "regex": "(?i)credit.*card.*",
                "confidenceLevel": 2
            },
            {
                "regex": "(?i)card.*credit.*",
                "confidenceLevel": 2
            }
        ],
        "countryID": "NA-",
        "precedence": "METADATA_REGEX",
        "customType": false
    },
    {
        "id": "CREDIT_CARD_NUMBER",
        "classificationID": "PCI",
        "description": "cc",
        "metadataRegex": [
            {
                "regex": "(?i)card.*number.*",
                "confidenceLevel": 1
            },
            {
                "regex": "(?i)ccn.*",
                "confidenceLevel": 1
            },
            {
                "regex": "(?i)CREDIT.*CARD.*NUMBER.*",
                "confidenceLevel": 2
            },
            {
                "regex": "(?i)credit_card_n.*",
                "confidenceLevel": 2
            }
        ],
        "dataRegex": "^([0-9]{4}[-._\\s\\-]?){3}[-._\\s\\-]?[0-9]{3};^([0-9]{4}[-._\\s\\-]?){4};^((4[0-9]{3})|(5[1-5][0-9]{2})|(6011))[-._\\s\\-]?[0-9]{4}[-._\\s\\-]?[0-9]{4}[-._\\s\\-]?[0-9]{4}|3[47]([-._\\s\\-]?[0-9]){13}",
        "categoryID": "CREDIT_CARD",
        "countryID": "NA-",
        "precedence": "DATA_REGEX",
        "customType": false
    },
    {
        "id": "JCB_CREDIT_CARD_NUMBER_TYPE_1",
        "classificationID": "PCI",
        "description": "Column holding JCB credit card number. TYPE_1 -> JCB cards beginning with 2131 or 1800 have 15 digits",
        "metadataRegex": [
            {
                "regex": "(?i)jcb.*card.*number.*",
                "confidenceLevel": 2
            },
            {
                "regex": "(?i)jcb.*ccn.*",
                "confidenceLevel": 2
            }
        ],
        "dataRegex": "^(?:2131|1800)[-._\\s]?\\d{4}[-._\\s]?\\d{4}[-._\\s]?\\d{3}$",
        "categoryID": "CREDIT_CARD_NUMBER",
        "countryID": "NA-",
        "precedence": "DATA_REGEX",
        "customType": false
    },
    {
        "id": "JCB_CREDIT_CARD_NUMBER_TYPE_2",
        "classificationID": "PCI",
        "description": "Column holding JCB credit card number.TYPE 2 -> JCB cards beginning with 35 have 16 digits.",
        "metadataRegex": [
            {
                "regex": "(?i)jcb.*card.*number.*",
                "confidenceLevel": 2
            },
```

```
        {
          "regex": "(?i)jcb.*ccn.*",
          "confidenceLevel": 2
        }
      ],
      "dataRegex": "^(35\\d{2})[-._\\s\\-]?\\d{4}[-._\\s\\-]?\\d{4}[-._\\s\\-]?\\d{4}$",
      "categoryID": "CREDIT_CARD_NUMBER",
      "countryID": "NA-",
      "precedence": "DATA_REGEX",
      "customType": false
    },
    {
      "id": "VISA_CREDIT_CARD_NUMBER",
      "precedence": "DATA_REGEX",
      "classificationID": "PCI",
      "description": "Column holding VISA credit card number",
      "metadataRegex": [
        {
          "regex": "(?i)card.*number.*",
          "confidenceLevel": 1
        },
        {
          "regex": "(?i)ccn.*",
          "confidenceLevel": 1
        },
        {
          "regex": " (?i)CREDIT.*CARD.*",
          "confidenceLevel": 2
        },
        {
          "regex": "(?i)card.*credit.*",
          "confidenceLevel": 2
        },
        {
          "regex": "(?i)CREDIT.*CARD.*NUMBER.*",
          "confidenceLevel": 2
        },
        {
          "regex": "(?i)credit_card_n.*",
          "confidenceLevel": 2
        }
      ],
      "categoryID": "CREDIT_CARD_NUMBER",
      "countryID": "NA-",
      "dataRegex": "^4[0-9]{12}(?:[0-9]{3})?$"
    }
]
```

The above sensitive type defines several different regexes and corresponding confidence levels if matched. Further, the sensitive type definition specifies a hierarchy of generic/specific regexes (e.g., more generic CREDIT_CARD_NUMBER" and more specific "VISA CREDIT_CARD_NUMBER").

Figure 3A:
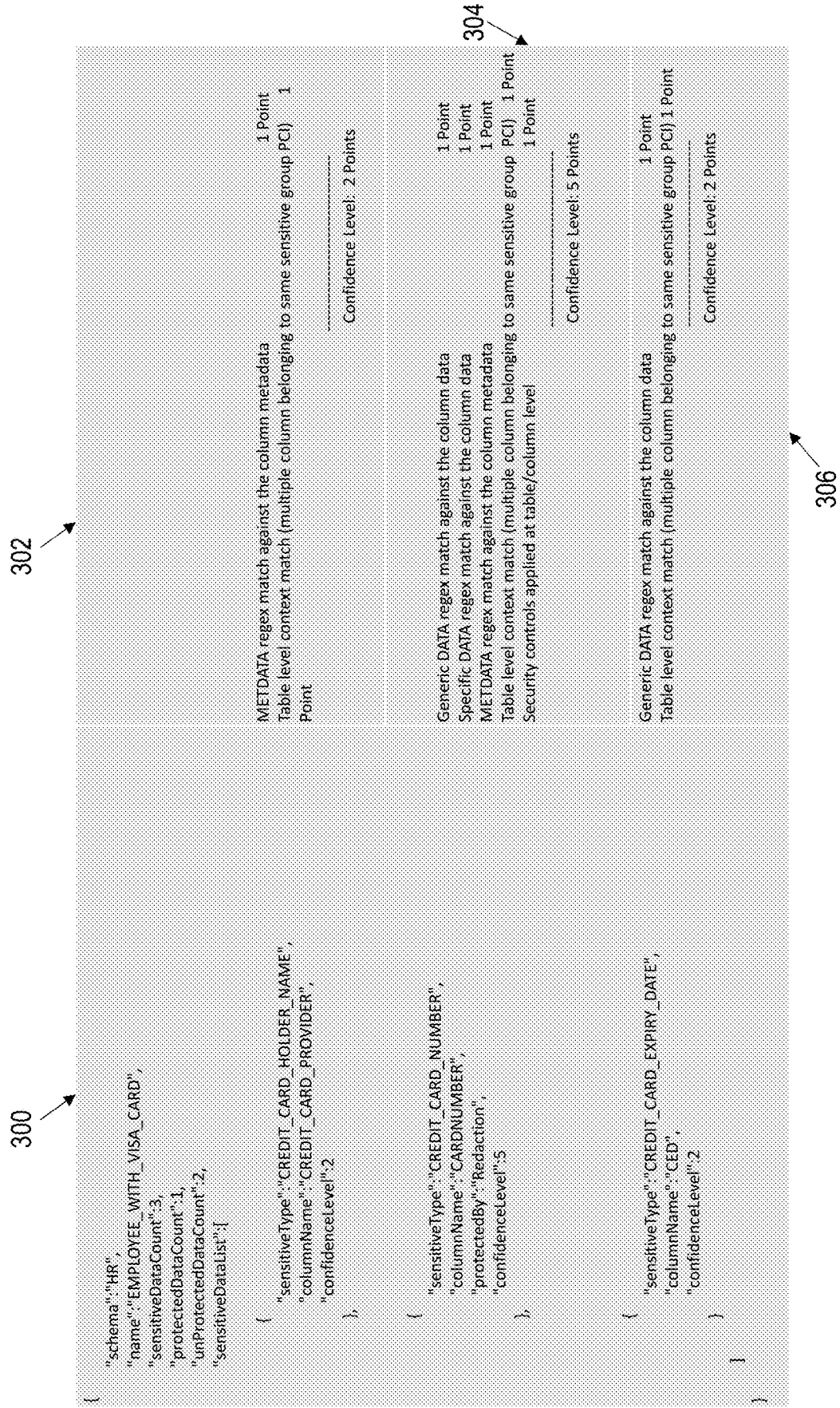
FIG. 3A illustrates an example sensitive data evaluation result based on a sensitive type definition in accordance with some embodiments.

FIG. 3A illustrates example sensitive data evaluation result 300 based on a sensitive type definition in accordance with some embodiments. Result 300 identifies the sensitive types that were identified for a given set of data. In the present example, the credit card holder's name, the credit card number, and the credit card expiry date were identified. The confidence scores for each sensitive type are reflected in 302, 304, and 306, respectively.

Additionally or alternatively, other sensitive type definitions may be defined to discover and protect other types of sensitive information. For example, a sensitive type for PII may be defined as follows:

```
"sensitiveTypes": [
    {
      "id": "IDENTITY_NUMBER",
      "classificationID": "PII",
      "description": "Identity number",
      "countryID": "NA-",
      "precedence": "DATA_REGEX",
      "customType": false,
      "dataRegex": "^(([0-9]{3}[\\s-][0-9]{2}(\\s|-)[0-9]{4})|([0-9]{3}[0-9]{6}))$"
    },
    {
      "id": "US_TAXPAYER_ID",
      "categoryID": "IDENTITY_NUMBER",
```

```
        "classificationID": "PCI",
        "description": "ITIN number",
        "metadataRegex": [
            {
                "regex": "(?i).*itin.*",
                "confidenceLevel": 3
            },
            {
                "regex": "(?i)tax.*identification.*",
                "confidenceLevel": 1
            },
            {
                "regex": "(?i)tin.*",
                "confidenceLevel": 2
            },
            {
                "regex": "(?i)tax*payer.*",
                "confidenceLevel": 2
            },
            {
                "regex": "(?i)tax.*identification.*",
                "confidenceLevel": 2
            },
            {
                "regex": "(?i)credit_card_n.*",
                "confidenceLevel": 2
            }
        ],
        "dataRegex": "^((9[0-9]{2}[\\s-][78][0-9](\\s|-)[0-9]{4})|(9[0-9]{2}[78][0-9]{5}))$",
        "countryID": "US",
        "precedence": "DATA_REGEX",
        "customType": false
    },
    {
        "id": "USA_SSN",
        "categoryID": "IDENTITY_NUMBER",
        "precedence": "DATA_REGEX",
        "classificationID": "PII",
        "description": "Column holding United States of America social security number",
        "metadataRegex": [
            {
                "regex": "(?i)SOCIAL.*",
                "confidenceLevel": 1
            },
            {
                "regex": "(?i)SSN.*",
                "confidenceLevel": 2
            },
            {
                "regex": "(?i)SOCIAL_SEC.*",
                "confidenceLevel": 2
            }
        ],
        "countryID": "USA",
        "dataRegex": "^(?!000|666)[0-8][0-9]{2}-(?!00)[0-9]{2}-(?!0000)[0-9]{4}$"
    }
]
```

FIG. 3B illustrates an example sensitive data evaluation result 308 based on a sensitive type definition in accordance with some embodiments. Result 308 identifies the sensitive types that were identified for a given set of data. In the present example, data object includes a national identifier for Ireland, a U.S. taxpayer identifier, and a U.S. social security number. The confidence scores for each sensitive type are reflected in 310, 312, and 314, respectively.

3.7 Example Implementation

An example implementation of the above techniques is provided herein for purposes of illustration. However, it should be noted that the example details, such as the scoring and sensitive type definitions, may vary from implementation to implementation, In the present example, confidence levels for a data object are computed as follows:

1. Generic DATA regex match against the column data—1 Point
2. Specific DATA regex match against the column data—1 Point
3. Generic METADATA regex match against the column metadata—1 Point
4. Specific METADATA regex match against the column metadata—2 Points or More
5. Table level context match (multiple column belonging to same sensitive group such as PCI, PII-1 Point (and this can be extended to across Schemas in the same database.)
6. Security controls applied at table/column level-1 Point An example metadata regex to identify if the column holds credit card number is as follows:

```
"metadataRegex":[
    {
        "regex":"(?i)card.*number.*".
        "confidenceLevel":1
    },
```

```
{
    "regex":"(?i)ccn.*",
    "confidenceLevel":1
},
{
    "regex":"(?i)CREDIT.*CARD.*",
    "confidenceLevel":2
},
{
    "regex":"(?i)card.*credit.*" ,
    "confidenceLevel":2
},
{
    "regex":"(?i)CREDIT.*CARD.*NUMBER.*",
    "confidenceLevel":2
},
{
    "regex":"(?i)credit_card_n.*",
    "confidenceLevel":2
}
}
```

A database may structure data as follows: schema→table-→columns.

```
"metadataRegex":[
    {
        "regex": "(?i)card.*number.*",
        "confidenceLevel":1
    },
    {
        "regex":"(?i)ccn.*",
        "confidenceLevel":1
    },
    {
        "regex":"(?i)CREDIT.*CARD.*",
        "confidenceLevel":2
    },
    {
        "regex":"(?i)card.*credit*",
        "confidenceLevel":2
    },
    {
        "regex":"(?i)CREDIT.*CARD.*NUMBER.*",
        "confidenceLevel":2
    },
{
        "regex":"(?i)credit_card_n.*",
        "confidenceLevel":2
    }
```

Security policies applied for the columns in the above mentioned table may be as follows
1. REDACTION→Email, PHONE and CREDIT_CARD_NUM
2. Encryption→CREDIT_CARD_NUM, CED SDDE 106 may run the evaluation process against the above data. The evaluation process may proceed column by column as follows:

Name column
  The Name column stores a varchar/string values that are generic and do not match with any sensitive type. Hence the Name column is not sensitive in nature.
Email column
  The value stored in the Email column matches the data regex of the sensitive type EMAIL. With the data regex match, the confidence level score for this sensitive column/data is incremented to 1.
  The metadata regex may further be applied on the column metadata for the Email column, and the regex match is positive. The confidence level score for this sensitive column/data is increased by 2 as defined in the metadata regex found in the Sensitive Type definition (EMAIL) given below. At this stage, the overall confidence level score is 3.
  SDDE 106 next finds similar group data in the same table. In this case, the Phone column and Email column are in the same table shares a similar context with both being associated with the PII compliance group. Thus, SDDE 106 may conclude that there are similar group data and increment the confidence level that the Email column stores EMAIL sensitive type data. At this stage, the overall confidence level score is 4.
  SDDE 106 may further determine if there are any security protection policies applied on the Email column. If there are security protection policies, such as encryption, redaction, and/or some other policies applied to the column data, then the confidence level of the sensitive type "EMAIL" is increased by 1. At this stage, the overall confidence level score is 5.
  A final confidence level score of 5 for the EMAIL sensitive type clearly indicates it is a TRUE POSITIVE case, ruling out the FALSE POSITIVE or TRUE NEGATIVE case.
Phone column
  The value stored in the Phone column matches the data regex of the sensitive type PHONE. With a positive data regex match, the confidence level score for the sensitive column/data is 1.
  A metadata regex may be applied on the column metadata including the column name "Phone". Here, the regex match is positive, and the confidence level score for this sensitive column/data is increased by 1. At this stage, the overall confidence level score is 2.
  SDDE 106 may further determine that the Phone column is in a similar group to the Email column, as previously indicated, and increase the confidence level score for this sensitive column/data by 1. At this stage, the overall confidence level score is 3.
  SDDE 106 may further determine whether there are any security protection policies applied on the Phone column. If there are security protection policies, then the confidence level of the sensitive type "PHONE" being found is increased by 1. At this stage, the overall confidence level score is 4.
  A final confidence level score of 4 for the PHONE sensitive type clearly indicates it is a TRUE POSITIVE case, ruling out the FALSE POSITIVE or TRUE NEGATIVE case.
CREDIT_CARD_NUM column
  The value stored in the CREDIT_CARD_NUM column matches the data regex of the sensitive type CREDIT_CARD_NUMBER. With a positive data regex match, the confidence level score for this sensitive column/data is 1.
  Next, a metadata regex is applied on the column metadata and the regex match is positive. Referring to the metadata regex found in the sensitive type definition (CREDIT_CARD_NUMBER) given below, the confidence level score is increased by 2 based on the metadata regex matching. At this stage, the overall confidence level score is 3.
  The CREDIT_CARD_NUMBER sensitive type is generic in that the corresponding regex may match any credit card number. To increase the confidence level and to rule out the FALSE POSITIVE, SDDE 106 may further apply the specific regex (such as AMEX regex, VISA regex and so on) belonging to a category called CREDIT_CARD_NUMBER on the same data. In this case, the VISA regex matches the value stored in the column, which increases the confidence level further by 1 level per the sensitive type definition below. At this stage, the overall confidence level score is 4.

SDDE 106 may further apply a specific metadata regex on the column metadata, as defined in the metadata regex found in the sensitive type definition (VISA_ CREDIT_CARD_NUMBER) given below. Here, there is a match on the column name, and the confidence level is incremented by 2. At this stage, the overall confidence level score is 6.

SDDE 106 next tries to find similar group data. In this example, the CREDIT_CARD_NUM and CED columns both belong to PCI compliance groups in the same table. As a result, the confidence level of the CREDIT_CARD_NUM column being actual CREDIT_CARD_NUMBER sensitive type is increased by 1. At this stage, the overall confidence level score is 7.

SDDE 106 may further determine if there are any security protection policies applied on this column. If there are security protection policies, then the confidence level of the sensitive type "CREDIT_CARD_NUMBER" found is increased by 1. At this stage, the overall confidence level score is 8.

A final confidence score of 8 for the CREDIT_CARD_NUMBER sensitive type clearly indicates it is a TRUE POSITIVE case, ruling out the FALSE POSITIVE or TRUE NEGATIVE case.

CED column
  The value stored in the CED column matches the data regex of the sensitive type CREDIT_CARD EXPIRY DATE. With a positive data regex match, the confidence level score for this sensitive column/data is 1.

SDDE 106 may further apply a metadata regex on the column metadata per the sensitive type definition below. Here, the regex match is positive, and the confidence level score for this sensitive column/data is increased by 1. At this stage, the overall confidence level score is 2.

SDDE 106 may further search for similar group data in the same table As previously noted, the CREDIT_CARD_NUM and CED columns both belong to the PCI compliance group. Hence, the confidence level of the CED column being actual CREDIT CARD EXPIRY DATE sensitive type is increased by 1. At this stage, the overall confidence level score is 3.

SDDE 106 may further determine if any security protection policies have been applied on the CED column. If there are security protection policies, then the confidence level of the sensitive type "CREDIT_CARD_EXPIRTY_DATE" being found is increased by 1. At this stage, the overall confidence level score is 4.

A final confidence level score of 4 for the CREDIT CARD EXPIRY DATE sensitive type clearly indicates it is a TRUE POSITIVE case, ruling out the FALSE POSITIVE or TRUE NEGATIVE case.

The sensitive type definition input for the above example may be defined as follows:

```
{
  "sensitiveTypes": [
    {
      "id": "CREDIT_CARD",
      "classificationID": "PCI",
      "description": "cc",
      "metadataRegex": [
        {
          "regex": "(?i)credit.*card.*",
          "confidenceLevel": 2
        },
        {
          "regex": "(?i)card.*credit.*",
          "confidenceLevel": 2
        }
      ],
      "categoryID": "CREDIT_CARD",
      "countryID": "NA-",
      "precedence": "METADATA_REGEX",
      "customType": false
    },
    {
      "id": "CREDIT_CARD_NUMBER",
      "classificationID": "PCI",
      "description": "cc",
      "metadataRegex": [
        {
          "regex": "(?i)card.*number.*",
          "confidenceLevel": 1
        },
        {
          "regex": "(?i)ccn.*",
          "confidenceLevel": 1
        },
        {
          "regex": "(?i)CREDIT.*CARD.*",
          "confidenceLevel": 2
        },
```

-continued

```
      {
        "regex": "(?i)card.*credit.*",
        "confidenceLevel": 2
      },
      {
        "regex": "(?i)CREDIT.*CARD.*NUMBER.*",
        "confidenceLevel": 2
      },
      {
        "regex": " (?i)credit_card_n.*",
        "confidenceLevel": 2
      }
    ],
    "dataRegex": "^([0-9]{4}[-._\\s\\-]?){3}[-._\\s\\-]?[0-9]{3};^(([0-9]{4}[-._\\s\\-]?){4});^((4[0-9]{3})|(5[1-5][0-9]{2})|(6011))[-._\\s\\-]?[0-9]{4}[-._\\s\\-]?[0-9]{4}[-._\\s\\-]?[0-9]{4}|3[47]([-._\\s\\-]?[0-9]){13}",
    "categoryID": "CREDIT_CARD",
    "countryID": "NA-",
    "precedence": "DATA_REGEX",
    "customType": false
  },
  {
    "ID": "CREDIT_CARD_EXPIRY_DATE",
    "precedence": "DATA_REGEX",
    "classificationID": "PCI",
    "description": "Column holding credit card expiry date",
    "metadataRegex": [
      {
        "regex": "(?i)ced.*",
        "confidenceLevel": 1
      },
      {
        "regex": "(?i)card_expiry.*",
        "confidenceLevel": 1
      },
      {
        "regex": "(?i)cce.*",
        "confidenceLevel": 1
      },
      {
        "regex": "(?i)credit_card_expiry.*",
        "confidenceLevel": 2
      },
      {
        "regex": "(?i)CARD_NUMBER_EXPIRY.*",
        "confidenceLevel": 2
      },
      {
        "regex": "(?i)CCN_EXPIRY.*",
        "confidenceLevel": 2
      },
      {
        "regex": "(?i)CREDITCARDEXPIRY.*",
        "confidenceLevel": 2
      }
    ],
    "dataRegex": "^(0[1-9]|1[0-2])\\/?([0-9]{4}|[0-9]{2})$",
    "countryID": "NA-",
    "categoryID": "CREDIT_CARD"
  },
  {
    "id": "VISA_CREDIT_CARD_NUMBER",
    "classificationID": "PCI",
    "description": "vcc",
    "metadataRegex": [
      {
        "regex": "(?i)card.*number.*",
        "confidenceLevel": 1
      },
      {
        "regex": "(?i)ccn.*",
        "confidenceLevel": 1
      },
      {
        "regex": "(?i)CREDIT.*CARD.*",
        "confidenceLevel": 2
      },
```

```
        {
            "regex": "(?i)card.*credit.*",
            "confidenceLevel": 2
        },
        {
            "regex": "(?i)CREDIT.*CARD.*NUMBER.*",
            "confidenceLevel": 2
        },
        {
            "regex": "(?i)credit_card_n.*",
            "confidenceLevel": 2
        }
    ],
    "dataRegex": "^4[0-9]{3}[-._\\s\\-]?[0-9]{4}[-._\\s\\-]?[0-9]{4}[-._\\s\\-]?(?:[0-9] {4})?$",
    "categoryID": "CREDIT_CARD_NUMBER",
    "countryID": "NA-",
    "precedence": "DATA_REGEX",
    "customType": false
},
{
    "precedence": "DATA_REGEX",
    "id": "EMAIL_ID",
    "classificationID": "PII",
    "description": "Column holding E-mail ID",
    "metadataRegex": [
        {
            "regex": "(?i)mail.*",
            "confidenceLevel": 1
        },
        {
            "regex": "(?i)email.*",
            "confidenceLevel": 2
        }
    ],
    "categoryID": "EMAIL_ID",
    "countryID": "NA-",
    "dataRegex": "^[a-zA-Z0-9._%+-]+@[a-zA-Z0-9.-]+.[a-zA-Z]{2,4}"
},
{
    "precedence": "DATA_REGEX",
    "id": "PHONE_NUMBER",
    "classificationID": "PII",
    "description": "phone number",
    "metadataRegex": [
        {
            "regex": "(?i)phone.*",
            "confidenceLevel": 1
        },
        {
            "regex": "(?i)phone_number.*",
            "confidenceLevel": 2
        }
    ],
    "dataRegex": "^([+]?\\d{1,2}[\\s.\\-]?)?(\\d{3}[.-]?){2}\\d{4}"
}
]
}
=============
```

4. Data Security Operations

4.1 Protective Measures by Confidence Score

When SDDE 106 discovers sensitive data, one or more operations may be performed to protect or otherwise ensure the data is secure. If the confidence score indicates a high level of confidence that the data is sensitive, then the operations may be triggered automatically. For lower confidence levels, it may be beneficial to query an administrator or other user before additional actions are taken. In other embodiments, the user may always be queried or otherwise notified when sensitive data is detected within a prescribed level of confidence. Alternatively, automatic actions may always be triggered without first prompting the user.

Figure 4:
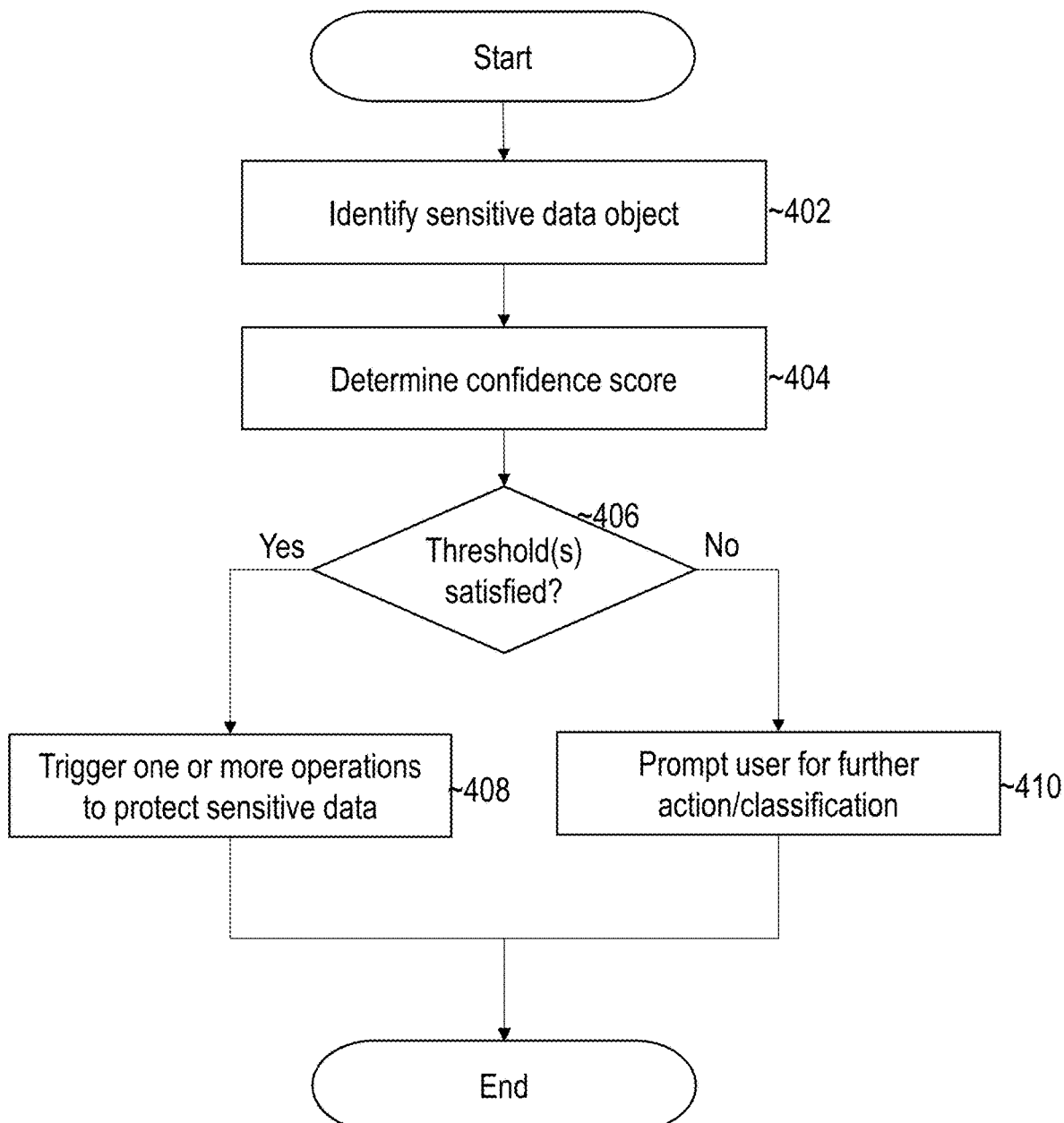
FIG. 4 illustrates an example set of operations for performing data security operations based on a set of evaluation results and confidence scores in accordance with some embodiments.

FIG. 4 illustrates an example set of operations for performing data security operations based on a set of evaluation results and confidence scores in accordance with some embodiments. One or more of the steps may be omitted, repeated, and/or performed in a different order. Accordingly, the specific arrangement of steps shown in FIG. 4 should not be construed as limiting the scope of the embodiments.

Referring to FIG. 4, the set of operations includes identifying a sensitive data object (operation 402). In some embodiments, DPE 110 may receive and/or parse the output from SDDE 106 to determine which of data objects 120 contain sensitive information. In the context of database objects, for instance, DPE 110 may identify, columns, views, and/or other database objects that SDDE 106 has flagged as sensitive in nature.

DPE 110 further determines the confidence score associated with the sensitive data object (operation 404). For example, DPE 110 may determine that a particular column or view was flagged by SDDE 106 as potentially sensitive with an associated confidence level score, which may be generated as previously described.

DPE 110 next determines whether one or more thresholds are satisfied (operation 406). Different operations may have different threshold confidence levels to trigger automatic actions. For example, a compliance check may be automatically triggered for a confidence level of "5", while a deletion operation may require a threshold of "8". The threshold may vary depending on the particular implementation and may be configurable by user 116. Additionally or alternatively, the user may configure notification thresholds. For instance, an alert may be set to be triggered if the confidence level satisfies a user-specified threshold, but not if the confidence level is below the threshold.

If one or more thresholds are satisfied, DPE 110 triggers one or more operations to protect the sensitive data (operation 408). Example operations, may include, but are not limited to, data masking, redaction, deletion, migration, encryption, and compliance checks, as described further below. Additionally or alternatively, DPE 110 may trigger notifications, such as email messages, short message service (SMS) messages, social media alerts, and/or other application-based notifications if the one or more thresholds are satisfied.

If a threshold for triggering an operation is not satisfied, DPE 110 prompts the user for further action/classification (operation 410). The prompt may request whether the user would like to perform any of the protection operations. Additionally or alternatively, the prompt may present the sensitive type and the confidence level that the data object matches the sensitive type. The user may confirm or reject the classification. The user feedback may be used to train machine-learning models and generate regexes/sensitive type definitions, as previously described.

4.2 Example Security Operations

In some embodiments, a data security operation comprises a data masking or redaction operation. Data masking involves physically changing the data stored in data store 118 to protect the data. All or a portion of the sensitive information may be removed and replaced with non-sensitive data. For example, a credit card number may be masked by replacing a portion of the number (e.g., everything but the last 4 digits) with the character "X" (XXXX-XXXX-XXXX-2412.

Data redaction is similar to data masking, but applies the mask during runtime without physically changing the data. For example, the full credit card number may be stored in the database. However, when an application attempts to access the number, it may be redacted in the same manner the data mask in the previous example was applied.

Additionally or alternatively, the level of encryption that is applied to data may be determined based, in part, on the confidence level. Heavy encryption schemes may provide greater security but take longer to process. If there is a high degree of confidence that a data object stores sensitive data of a particular type, then the heavier encryption scheme/algorithm may be used to encrypt the data. For other sensitive types and/or confidence levels, lighter encryption schemes/algorithms may be used.

Additionally or alternatively, DPE 110 may automatically delete sensitive data. For example, SDDE 106 may monitor uploads to a cloud environment for sensitive data of a particular sensitive type. If detected, DPE 110 may automatically delete the data. Thus, cloud providers may quickly and automatically block or remove sensitive information from their platforms before the sensitive data is widely exposed.

In some embodiments, DPE 110 may trigger data migration policies when sensitive data is detected. For example, SDDE 106 may detect sensitive data in an unexpected storage location, such as a legacy server that is not as secure as more up-to-date servers. In response DPE 110 may migrate the data to a more secure location.

In some embodiments, DPE 110 may perform compliance checks on a data object. For example, a compliance check may be run to ensure that data is encrypted, masked, and/or otherwise stored in a manner that is compliant with federal rules and regulations. If noncompliant, DPE 110 may generate an alert to notify an administrator to take appropriate corrective action, or the corrective action may be automatically implemented by DPE 110.

5. Automatic Relationship Discovery 5.1 Discovery Parameters and Configuration Settings In some cases, referential relationships are not defined by a database but enforced by an application. For example, an application may replicate data across several different tables and/or database columns while performing functions that are opaque to the database layer, which may include a query analytic system for processing SQL commands submitted to the database by the application. Stated another way, the data layer may have little to no information about what functions the applications are performing for a given workload and why the functions are being executed.

Relying on the application layer to enforce referential relationships may lead to inadvertent exposure to sensitive information. For example, when performing real-world testing, a client may generate a test database that relies on the techniques of data masking to replace sensitive data with false but realistic looking data and/or data subsetting to create a functional and referentially intact subset database. Applying data masking and subsetting to generate the test database helps avoid the risk of exposing sensitive data to non-production users. However, some of the data relationships may not be defined in database metadata, such as a database dictionary. Rather, the relationships may be embedded in the application logic. Thus, performing data masking and/or data subsetting at the database layer runs the risk of ignoring relationships that are indicative of sensitive data. For instance, a data masking operation may be applied to data stored in one column but not a related column storing similar confidential information.

In some embodiments, RDE 108 is configured to automatically discover relationships between data objects 120, even if the relationships have not been defined in metadata 122, such as database dictionaries and/or other information defining attribute associated with data objects 120. Relationships between data objects 120 may or may not be embedded in application logic (e.g., logic implemented by clients 102*a-b*). Further, the relationships may or may not be opaque to analytic services 114.

Figure 5A:
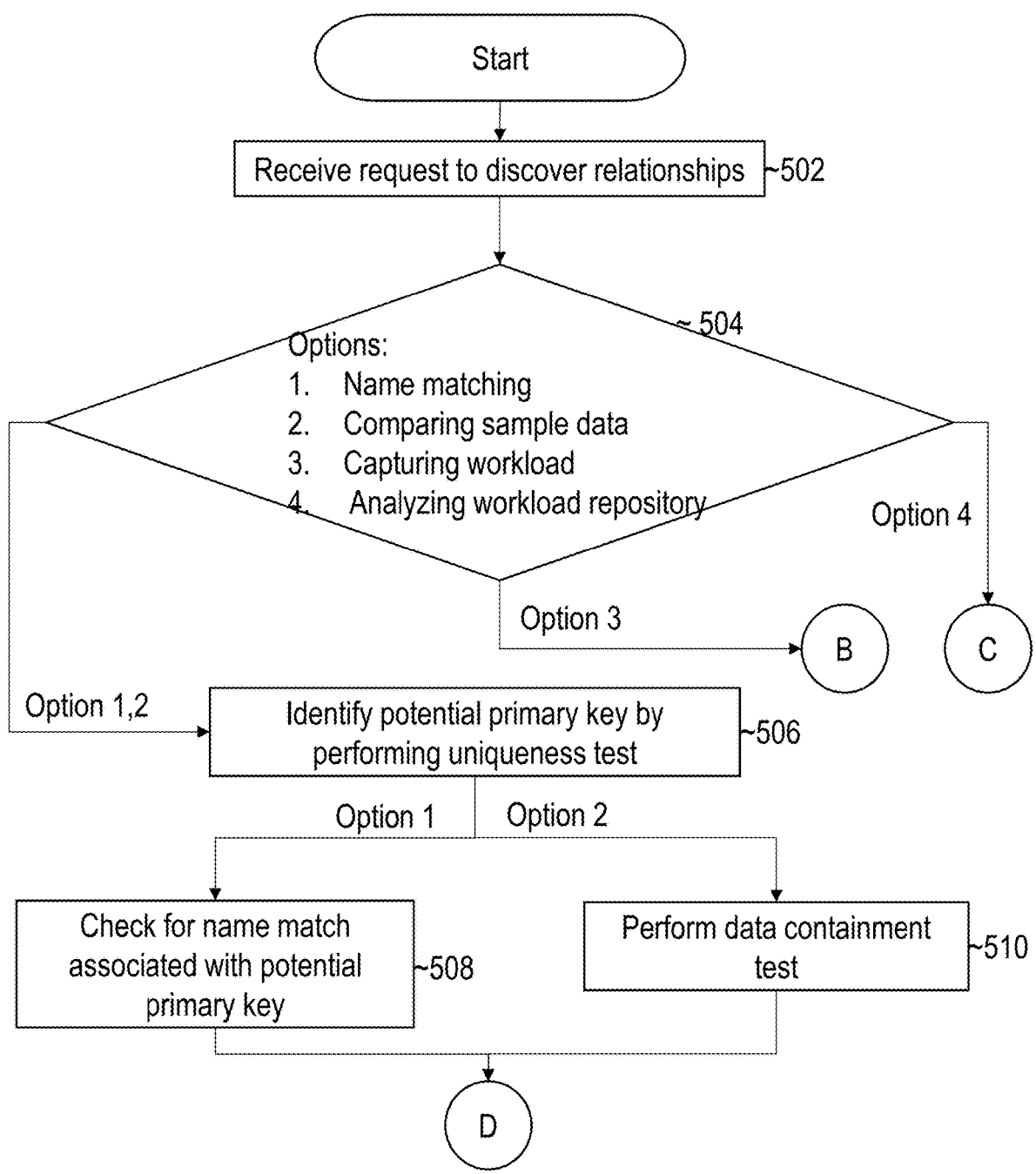
FIG. 5A illustrates an example set of operations for discovering relationships between data objects based on name and data pattern matching in accordance with some embodiments.
Figure 5B:
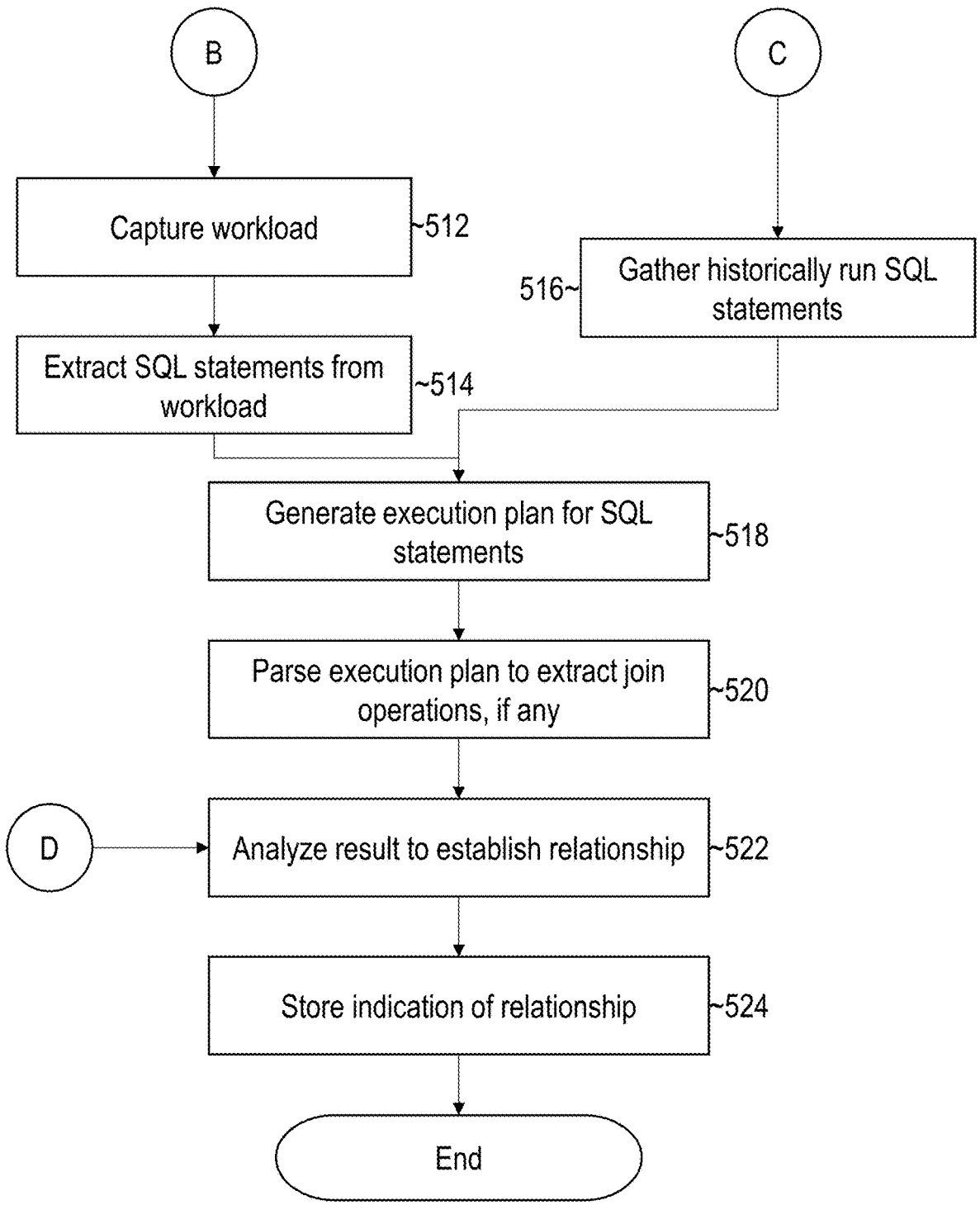
FIG. 5B illustrates an example set of operations for discovering relationships based on workload and query analytics in accordance with some embodiments.

FIGS. 5A and 5B illustrate an example set of operations for discovering relationships between data objects based on data storage and access patterns in accordance with some embodiments. More specifically, FIG. 5A illustrates an example set of operations for discovering relationships between data objects based on name and data pattern matching, and FIG. 5B illustrates an example set of operations for discovering relationships based on workload and query analytics in accordance with some embodiments. One or more of the steps may be omitted, repeated, and/or performed in a different order. Accordingly, the specific arrangement of steps shown in FIGS. 5A and 5B should not be construed as limiting the scope of the embodiments.

Referring to FIG. 5A, the set of operations includes receiving a request to discover relationships (operation 502). In some embodiments, the request may be received from an application or other user. In other embodiments, the discovery process may be performed periodically and/or in response to other triggering events (e.g., database accesses, SQL commands, etc.)

RDE 108 determines which of a set of one or more operations to use to discover relationships (operation 504). Example options may include, but are not limited to:

1. Name matching;
2. Comparing sample data;
3. Analyzing captured workload; and/or
4. Analyzing workload repository.

Techniques for implementing these options are described in further detail in the sub-sections below. RDE 108 may implement an option independently of other options and/or may combine one or more of the options, depending on the particular implementation.

In some embodiments, the discovery options that are used by RDE 108 may be selected by a user. For example, RDE 108 may prompt a user to select the options during the discovery process. In other cases, the options may be specified beforehand (e.g., using a set of discovery parameters/configuration settings). Additionally or alternatively, a set of default options may be automatically selected and/or preconfigured, depending on the particular application.

5.2 Name Matching

In some embodiments, RDE 108 detects relationships between data objects based on column name matching. In this technique, RDE 108 searches tables, views, and/or other database objects to determine whether two or more database objects substantially share or reference the same object name. For example, if table A has column name C1 and other tables reference A.C1, then the other tables also have the same column name C1. In the context of an enterprise system, for instance, a database may store an HR.EMPLOYEES table that references 'DEPT_ID' of an HR.DEPARTMENTS table. Thus, the HR.EMPLOYEES table is also determined to have a DEPT_ID column. Column name matching may identify a list of such matching columns with the same name and same data type. The technique may report the matching columns as potential primary key-foreign key pairs.

Referring again to FIG. 5A, object name matching corresponds to option 1. Thus, if this option is selected, the process proceeds with identifying a primary key by performing a uniqueness test (operation 506). The uniqueness test may check the values in each column (or other object) to determine whether a threshold number of values are unique and non-NULL values. A column within a pair satisfying the uniqueness test may be flagged as a potential primary key and the other column as a potential foreign key.

Once the primary key is identified, RDE 108 checks for a name match associated with the primary key (operation 508). Some applications might implement a strict name match where an exact match between the primary key and foreign key is required. In other embodiments, the process may allow for some variance in the names, where a match is detected even if the names are not strictly the same. In the latter case, a pattern matching filter may be implemented, where a match is detected if the names follow similar patterns. For example, a primary key named CREDIT_CARD_NUMBER and a foreign key named CC_NUMBER might be determined to be a match even though the names are not exactly the same.

If a name match is detected, then the column pair may be flagged as having a potential primary-foreign key relationship. RDE 108 may store this indication in data store 118. In some embodiments, RDE 108 may maintain and increment a confidence score that the column pair is related. The confidence score may be further incremented, decremented, and/or otherwise updated based on the analytics described in further detail below.

5.3 Data Matching

To minimize the false positives from the object name matching technique, a data matching technique may be introduced as an extension or as an alternative. In some embodiments, this option matches sample data from data object to check if the data present in a potential foreign key column is "contained" in the potential primary key column. If a threshold amount of data stored in two disparate objects overlaps, then a match may be detected.

In some embodiments, RDE 108 may receive, as input, regular expressions and/or other data patterns to limit the search scope. For example, for two columns storing credit card information, RDE 108 may limit the search scope to the last four digits of potential card numbers or the issuer identification numbers rather than comparing entire credit card numbers. This approach allows for more efficient and scalable searches. It further allows information to be gleaned about how different columns or other data objects may be related. For instance, comparing issuer identification numbers may reveal that the two columns both store credits cards from the same credit card issuer and/or from different credit card issuers.

Referring again to FIG. 5A, data matching corresponds to option 2. If option 2 is selected, the process identifies a potential primary key by performing the uniqueness test (operation 506). As previously mentioned, the uniqueness test may be performed by filtering columns which are unique and flagging one or more of these columns as potential primary key columns.

Data matching further comprises performing a data containment test (operation 510). If a particular object under evaluation, such as a column, stores data matching a threshold percentage of data from the primary key object, then RDE 108 may mark the object as having a potential foreign key relationship with the primary key column. The threshold percentage may vary depending on the particular implementation. In some embodiments, the threshold may be tuned in a manner that accounts for applications having "orphan" data. Orphan data in this context refers to data which is present in a foreign key column (or other object) but not present in the primary key column.

The containment test may establish a link between two objects that have a significant overlap in data. In some embodiments, the containment test may be implemented by joining columns in two tables and comparing the number of joined tuples with the number of tuples in the foreign key column. For example, the following code returns a match if 90% of the tuples in the foreign key column were able to be joined with the primary key column:

```
select count(*) into join_column_count from
referred_schema_name.referred_table_name F,
primary_schema_name.primary_table_name P
where P.primary_column_name=F.referred_column_name
if (join_column_count>90% referred_column_count)
  return match;
```

As previously noted, the threshold is adjustable and may vary from implementation to implementation. A lower threshold may be used to cast a wider net, which may be useful to find data that has been neglected and is not currently up to date. A higher threshold may be used to reduce the number of matches that are returned.

Additionally or alternatively, data matching may be useful to identify other potential relationships, such as other types of key pairings. For example, two or more objects may share a composite key relationship. A composite key relationship may be established when the combination of two or more objects uniquely identify a row or record in a table. To identify composite keys, RDE 108 may group two or more columns from a table into a single potential composite primary key column. RDE 108 may then perform the data containment test previously described against potential composite foreign key columns. If the threshold is satisfied, then RDE 108 may determine that a composite key relationship exists between the two or more columns.

In some embodiments, RDE 108 increments a confidence score that two or more columns are related if the data matching containment tests is satisfied. If the threshold is not satisfied, then RDE 108 may leave the confidence score the same or may decrement the score. Additionally or alternatively, RDE 108 may store an indication of the type of relationship that was detected. For example, RDE 108 may store an indication that two or more objects likely share a primary-foreign key or a composite key relationship. This information may be useful to determine what types of security policies and/or other controls to apply to the objects.

5.4 Mining Real Application Workloads

Option 1 and 2 above related to establishing relationships based on data storage access patterns. That is, the relationships are detected based on how applications have stored data in the database, even though the applications may not have explicitly defined these relationships through the SQL commands and database queries used to store the data. Options 3 and 4 relate to detecting relationships based on query access patterns. Rather than analyzing patterns on how the underlying data has been stored and structured by applications within the database, these options analyze how the applications are utilizing the data. Certain patterns of query accesses may be indicative that two or more objects are related.

Referring to FIG. 5A, option 3 comprises analyzing captured workloads for data access patterns. In some embodiments, option 3 enables users to perform real-world testing by capturing production workloads and replaying the workloads in a test environment. The workloads may comprise a set of SQL commands and/or other database queries performed for a particular application. For example, an HR schema may include an Employees table, a Departments table and/or some other tables. When storing the data, an application may have neglected to define a primary-foreign key relationship on a dept_id column in the Departments table and a dept_id column in the Employees table within a database dictionary. In one of the applications reports or workflows, the following may be presented: "Employee and his office addresses to the end users. In order to achieve such report/functionality, applications have to issue queries that join 'Departments' and 'Employees tables." The end user may subsequently submit, via the applications, the queries that join the two tables together. RDE 108 may identify such kind of queries in a given workload to discover potential primary-foreign key column pairs.

Referring to FIG. 5B, option 3 includes capturing a workload (operation 512). For example, the workload may comprise database and/or other structured queries submitted to a query analytic system (e.g., query execution engine 104). The queries may be analyzed in real-time and/or in batches, depending on the particular implementation.

Query execution engine 104 then extracts SQL statements from one or more queries in the workload (operation 514). For example, query execution engine 104 may extract SELECT statements that have JOIN clauses to analyze. Additionally or alternatively, query execution engine 104 may target other commands from the workload that follow patterns of interest.

Query execution engine 104 may then generate an execution plan for the SQL statements (operation 518). For example, query execution engine 104 may compile the query to generate a plan comprising an ordered set of operators used to access data from a database. The query execution plan may be the original plan or an optimized plan, depending on the particular implementation.

RDE 108 parses the execution plan to extract a set of target operations, if any (operation 520). For example, RDE 108 may identify a list of SELECT statements, and an explain plan for each of the statements to derive the execution plan for the corresponding SQL. While traversing the execution plans, RDE 110 may look for join statements and/or other target operators. Example joins are represented as below:

Sort Merge Join
  SQL>EXPLAIN PLAN FOR
  SELECT E.DEPTNO, D.DEPTNO FROM EMP E, DEPT D
  WHERE E.DEPTNO=D.DEPTNO ORDER BY D.DEPTNO;
  Query Plan
  ---------------
  SELECT STATEMENT [CHOOSE] Cost=17
    MERGE JOIN
      SORT JOIN
        TABLE ACCESS FULL EMP [ANALYZED]
      SORT JOIN
        TABLE ACCESS FULL DEPT [ANALYZED]
Nested Loops
  SQL>EXPLAIN PLAN FOR
  SELECT A.DEPTNO, B.DEPTNO FROM DEPT A, EMP B
  WHERE A.DEPTNO=B.DEPTNO;
  Query Plan
  ---------------
  SELECT STATEMENT [CHOOSE] Cost=5
    NESTED LOOPS
      TABLE ACCESS FULL DEPT [ANALYZED]
      TABLE ACCESS FULL EMP [ANALYZED]
Hash Join
  SQL>EXPLAIN PLAN FOR
  SELECT/*+use_hash(emp)*/E.EMPNO FROM EMP E, DEPT D
  WHERE E.DEPTNO=D.DEPTNO;
  Query Plan
  ---------------
  SELECT STATEMENT [CHOOSE] Cost=3
    HASH JOIN
      TABLE ACCESS FULL DEPT
      TABLE ACCESS FULL EMP
Cartesian product
  SQL>EXPLAIN PLAN FOR
  SELECT EMP.DEPTNO, DEPT.DEPTNO FROM EMP, DEPT;

Query Plan
---------------
SELECT STATEMENT [CHOOSE] Cost=5
  MERGE JOIN CARTESIAN
    TABLE ACCESS FULL DEPT
    SORT JOIN
      TABLE ACCESS FULL EMP The process may parse the explain plan output to search for an ACCESS_PREDICATE column in a table that stores the joining condition. The process may then obtain the columns that are participating in the join and flag the columns as potential primary-foreign key pairs. Additionally or alternatively, RDE 108 may increment a confidence score associated with the pairing to reflect an increased likelihood that the columns are related.

In the examples above, RDE 108 identifies relationships based on co-occurrence of objects in join operations. Additionally or alternatively, RDE 108 may establish relationships based on other access patterns as described further below in Section 5.6, titled "ACCESS PATTERN ANALYTICS AND MACHINE LEARNING"

5.5 Mining Workload Repositories

In addition or as an alternative to mining real workloads for relationships, RDE 108 may mine workload repositories for historically run queries. Referring to FIG. 5B, option 4 includes gathering historically run SQL statements (operation 516). For example, historically run SQL texts may be captured in views, logs, and/or other database files. RDE 108 may analyze the historically run queries to identify historic access patterns, such as historically run join operations, that are indicative of relationships between seemingly disparate objects.

With option 4, the process may generate an execution plan and parse the execution plan, similar to option 3 described above. After options 1, 2, 3, and/or 4 have been run, RDE 108 may analyze the results to determine whether to establish any discovered relationships at the data layer (operation 522). In some embodiments, a relationship may be established based on the result from running a single option. For example, any one of column name matching, data matching, or query analytics discovery potentially related columns, then RDE 108 may flag these objects as related. In other embodiments, a relationship may be established if a threshold number of options detect a relationship or if a confidence score that two objects are related satisfies a threshold. The options and/or associated confidence scores may be weighted differently, depending on the particular implementation. For instance, a confidence score may be incremented more when a relationship is discovered through data matching than through name matching or vice versa. Thus, the weights and associated thresholds may vary from implementation to implementation.

RDE 108 then stores an indication of a relationship, if detected (operation 522). For example, RDE 108 may store, in a dictionary, an indication of a primary-foreign key relationship. In other embodiments, RDE 108 may first present the indication to a user for review. If the user confirms the relationship, then the database dictionary and/or other metadata associated with the objects may be updated to identify the relationship.

In some embodiments, the stored indication identifies a type of discovered relationship between the two objects. For example, the stored indication may indicate whether the objects are primary-foreign key pairs, composite keys, or related in some other way.

5.6 Access Pattern Analytics and Machine Learning

As previously mentioned, RDE 108 may analyze queries for one or more access patterns to discover relationships between objects. The examples presented above related to searching for objects that were joined together, such as through a sort merge join, a nested loop join, a hash join, or a cartesian product. In some embodiments, RDE 108 may search for frequently recurring joins to establish relationships. For example, two columns may be related if and only if joined more than a threshold number of times. In other embodiments, a single join may be sufficient to link two columns together as potentially related.

Additionally or alternatively, RDE 108 may search for objects with references that frequently co-occur in database queries submitted by applications, even if not joined together.

For example, queries may frequently use two or more columns as predicates for selecting or filtering rows. RDE 108 may analyze WHERE clauses and/or other operators for such frequently co-occurring columns. RDE 108 may flag columns with references that co-occur more than a threshold number of times or the top n most frequent co-occurring columns. Additionally or alternatively, RDE 108 may increment or otherwise adjust a confidence score that two objects are related if they frequently co-occur in queries.

Additionally or alternatively, RDE 108 may search for objects that are frequently substituted in similar database queries. If two columns are used interchangeably within queries, then it may be indicative that queries share similar data or are otherwise related in some manner.

Additionally or alternatively, RDE 108 may compare value ranges for different objects. Objects storing frequently recurring values may not be of interest to users searching for columns storing sensitive objects as sensitive information, such as social security numbers, credit card numbers, birthdates, etc. are less likely to recur frequently. Therefore, RDE 108 may restricts the search to objects where the uniqueness of the object values satisfies a threshold, similar to the uniqueness test described above.

Additionally or alternatively, RDE 108 may compare metadata for objects to identify relationships. Objects with matching metadata patterns, such as matching object names, creation dates, and sources, may be more likely to be related. Therefore, RDE 108 may flag two objects that have matching metadata.

In some embodiments, RDE 108 maintains a confidence score that reflects a likelihood that two objects are related. The confidence score may be incremented, decremented, and/or otherwise adjusted as a function of the patterns that were detected. For example, if two objects are frequently joined together, have matching names, and are frequently substituted in similar database queries, then an unweighted confidence score of 3 may be assigned to reflect that 3 access patterns were detected. In other embodiments, certain factors may be weighted more heavily than others. For instance, recurring joins may be weighted more heavily than co-occurrence in other cases as a join operation may reflect a higher likelihood that two objects are related, depending on the particular application.

In some embodiments, RDE 108 may train and evaluate machine learning models based one or more of the above patterns. Example machine learning models may include, but are not limited to binary classification models, multiclass classification models, regression models, and neural networking models. In some embodiments, the trained model assigns different weights to patterns or combinations of patterns as a function of how predictive it is that two objects are related.

In some embodiments, RDE 108 trains the machine learning models by forming feature vectors for different examples in a set of training data. A feature vector may comprise one or more bits, where each bit indicates whether a corresponding pattern was detected or not. For example, one bit may indicate whether column names were matched, a second bit may indicate whether the data containment test was satisfied, a third bit may indicate whether the objects were detected in a join operation, and a fourth whether the objects were frequently substituted. Additionally or alternatively, any other features may be incorporated into the feature vector.

In some embodiments, the examples are labeled based on feedback from a user. For example, if a potential relationship is detected, it may be presented to a user to review. The user may then confirm or deny the existence of a relationship. The user feedback may be used to train and update the machine learning model. For example, the feature vector for the example may be used to train and/or update classifications or regression trees, clusters, neural network nodes, and/or other machine learning artifacts.

In some embodiments, RDE 108 uses a trained model to evaluate new examples. For example, RDE 108 may form a feature vector for two columns or other objects based on which patterns indicative of a potential relationship were detected. RDE 108 may then evaluate whether the two objects were as a function of the feature vector and the trained model. The evaluation function may vary depending on the machine learning model used. For example, a clustering approach may assign the new example based on Euclidean distance. Another approach is to average the predications from individual regression trees for each feature or taking a majority vote from the classification trees. Thus, the evaluation function may vary depending on the particular implementation.

6. Data Security Based on Detected Sensitivity and Learned Relationships 6.1 Interfaces for Managing Data Security and Discovery In some embodiments, control console 112 provides a frontend interface through which users may manage various aspects of the data security and discovery process previously described. For example, control console 112 may present webpages and/or other web interfaces through which the user may run the data security and/or relationship discovery processes.

Figure 6:
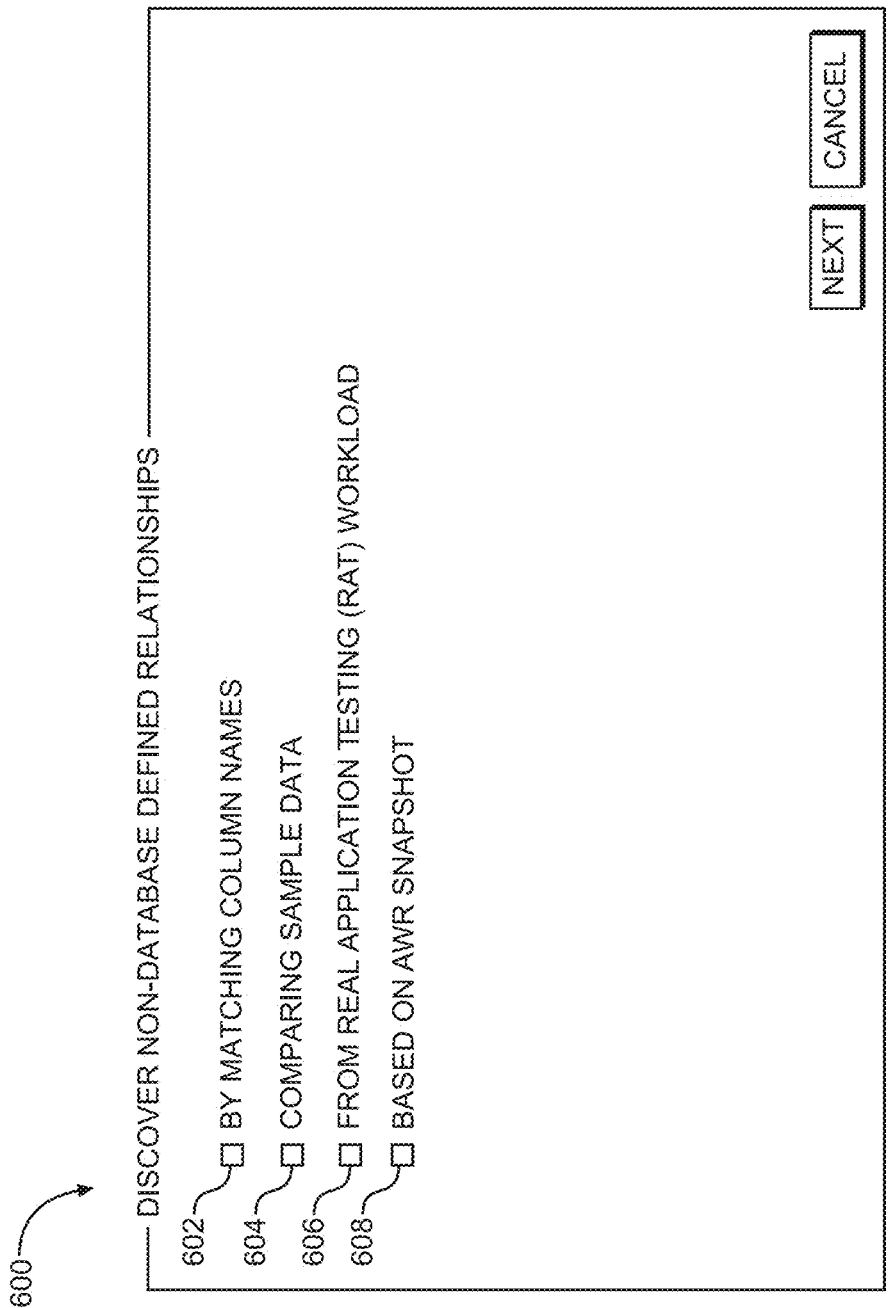
FIG. 6 illustrates an example interface for controlling search parameters for automatic discovery of relationships in accordance with some embodiments.

FIG. 6 illustrates example interface 600 for controlling search parameters for automatic discovery of relationships in accordance with some embodiments. The user may select checkboxes 602, 604, 606, and/or 608 to run the discovery process. The checkboxes correspond to Options 1-4 of the discovery process previously discussed.

An interface may further present information about discovered relationship. For example, in response to selecting "Next" in interface 600, the discovery process may be run using the selected options. The results may then be presented and displayed through the interface. The results may identify what data objects are related, and how they are related. For example, the results may present the name/location of a primary key column that was discovered, and the names/locations of one or more foreign key columns.

Additionally or alternatively, the interfaces may identify which objects, if any, were identified as including potentially sensitive information. For example, the interface may present a list of columns that were identified as potentially sensitive. The list of objects may be sorted, filtered, or otherwise presented as a function of the confidence score. For instance, only the objects having a threshold confidence level score or the top n highest confidence level scores may be presented, sorted from highest to lowest. The list may also indicate whether any related objects were discovered.

In some embodiments, the interface allows a user to provide feedback on the returned results. For example, a user may confirm or deny that an object in a list includes sensitive information or is related to another object. The user feedback may be used as labels and returned to RDE 108 to update/retrain the machine learning models. Thus, the accuracy of the predictions may improve over time and adapt to system changes.

In some embodiments, the interface allows a user to view and execute security operation to protect sensitive data. For example, the user may navigate a list of data objects that were discovered as having sensitive objects and related objects, if any. The user may select one or more of the data objects via the interface to view what security controls, if any, have been applied. For instance, the interface may display the name of an encryption algorithm that has been applied to a column, whether any of the data has been masked or redacted, etc. Additionally or alternatively, the interface may display available and recommended security operations for the data object, such as recommended encryption, data masking, and/or redaction policies to apply.

Recommended security operations for a given data object may vary depending on the particular implementation. In some embodiments, recommendations may be based on the sensitive group to which an object is masked. For example, differing data masking and/or encryption algorithms may be recommended depending on whether a data object was classified as PCI, PHI, PII, etc. The user may select any of the recommended or otherwise available security operations via the interface to trigger execution of the security operation. In response, the system may encrypt, redact, mask, and/or otherwise process the data in accordance with the selected operations.

6.2 Propagating Security Operations Based on Learned Relationships

In some embodiments, the automatically discovered relationships may be used to enhance data security. For example, when a test database is generated, data masking or subsetting may be performed against a particular column. Upon detecting a learned primary-foreign key relationship, this operation may be propagated to related columns, even though the requesting entity may not have specifically identified or even been aware of the related columns. Thus, the risk of inadvertently exposing non-production users to sensitive data may be reduced.

Figure 7:
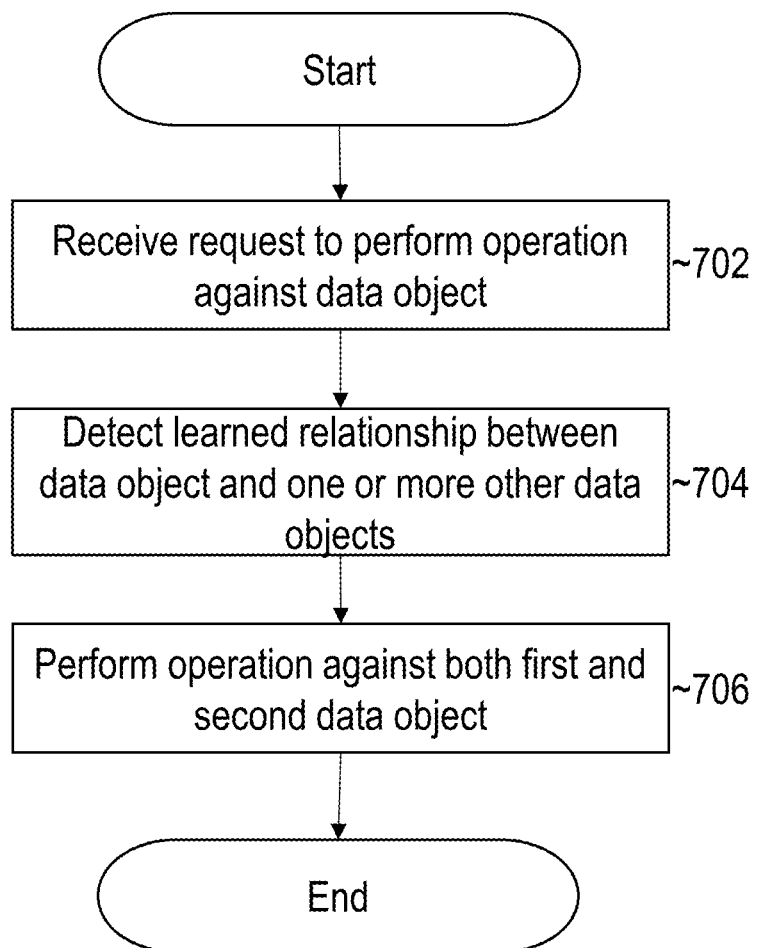
FIG. 7 illustrates an example set of operations for propagating security operations based on learned relationships in accordance with some embodiments.

FIG. 7 illustrates an example set of operations for propagating security operations based on learned relationships in accordance with some embodiments. One or more of the steps may be omitted, repeated, and/or performed in a different order. Accordingly, the specific arrangement of steps shown in FIG. 7 should not be construed as limiting the scope of the embodiments.

The set of operations includes receiving a request to perform an operation against a data object (operation 702). For example, a data masking, redaction, encryption, subsetting, and/or other operations may be requested against a particular column or other database object.

RDE 108 detects (either before or after the request) that there is a relationship between the data object and one or more other data objects (operation 704).

Based on the learned relationship, the operation is performed against both the first object and one or more related objects (operation 706). For example, a data masking operation applied to one column storing credit card data may be automatically. applied to another column storing credit card data. In some embodiments, the operations may be automatically applied. In other embodiments, a user may be prompted to determine whether they would like to apply the operation to related columns. The prompt may identify which data objects are related and how they are related (e.g., foreign-primary key relationships).

The user may be given the option to be prompted each time a security operation is applied or may store an indication that future operations should be applied by default across all related objects. Additionally or alternatively, the user may select specific operations to propagate. For example, the user may wish to automatically propagate only data masking and redaction operations to related objects, but not encryption or subsetting operations. For the unselected operations, the user may prompted on a case by case basis.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
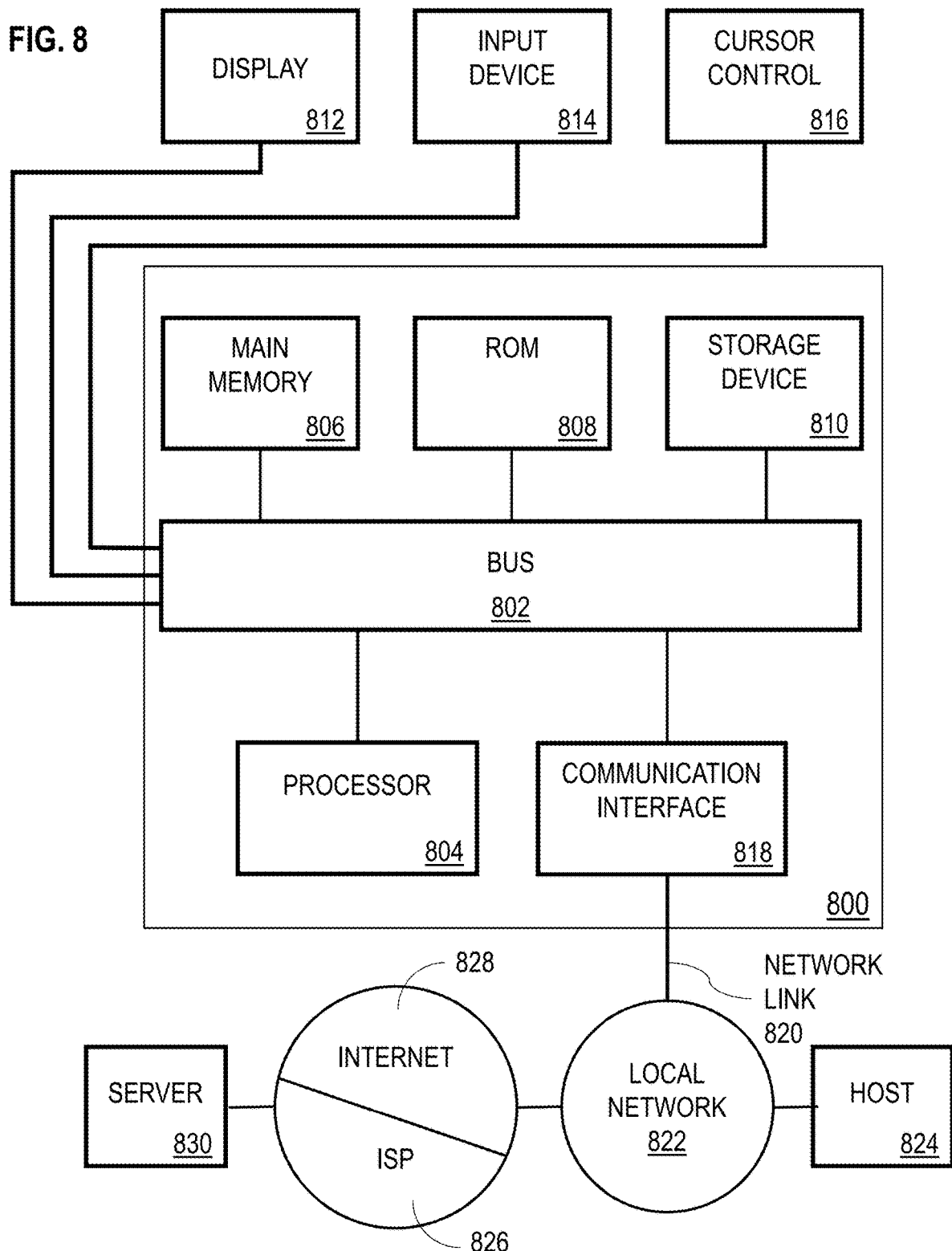
FIG. 8 shows a block diagram that illustrates a computer system in accordance with one or more embodiments.

For example, FIG. 8 is a block diagram that illustrates computer system 800 upon which an embodiment of the invention may be implemented. Computer system 800 includes bus 802 or other communication mechanism for communicating information, and a hardware processor 804 coupled with bus 802 for processing information. Hardware processor 804 may be, for example, a general purpose microprocessor.

Computer system 800 also includes main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light emitting diode (LED) monitor, for displaying information to a computer user. Input device 814, which may include alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. Input device 814 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 800 can receive the data on the network line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   searching a set of data objects for data matching a first set of one or more regular expressions;
   wherein the first set of one or more regular expressions include a generic regular expression and a set of one or more specific regular expressions that are associated with the generic regular expression;
   generating a confidence score for a particular data object in the set of data objects as a function of regular expressions in the first set of one or more regular expressions that match data stored by the data object;
   wherein generating the confidence score comprises:
      matching the generic regular expression to data in the particular data object;
      responsive to matching the generic regular expression, adjusting the confidence score to reflect a higher level of confidence that the particular data object includes sensitive data;
      determining whether the set of one or more specific regular expressions match data from the particular data object, and
      for each specific regular expression that matches data from the particular data object, adjusting the confidence score to reflect a higher level of confidence that the particular data object includes sensitive data; and performing at least one operation to protect sensitive data stored in the particular data object based, at least in part, on the confidence score.

2. The method of claim 1, wherein the confidence score is further generated as a function of contextual information associated with the data object, wherein the contextual information identifies a group category for the data object.

3. The method of claim 1, wherein the confidence score is further generated as a function of security controls applied to the data object.

4. The method of claim 1, wherein at least one regular expression in the first set of one or more regular expressions is associated with a first weight, wherein at least one regular expression in the first set of one or more regular expressions is associated with a second weight, and wherein the confidence score is further generated as a function of the first weight and the second weight.

5. The method of claim 1, further comprising: identifying a sensitive data object that includes sensitive data; responsive to identifying the sensitive data object, generating at least one data regular expression and at least one metadata regular expression; wherein the at least one data regular expression is included in the first set of one or more regular expressions and the at least one metadata regular expression is included in a second set of one or more regular expressions.

6. The method of claim 1, wherein performing the at least one operation comprises: performing at least one of: applying a data masking script to at least the particular data object to mask the sensitive data, applying a data redaction policy on a document that includes the sensitive data if the confidence score satisfies a threshold, deleting the particular data object, triggering a compliance check on the particular data object, or encrypting the sensitive data within the data object based on the confidence score.

7. The method of claim 1, further comprising: receiving a set of discovery configurations that identify regular expressions and corresponding confidence scores; wherein the confidence score is generated by aggregating the corresponding confidence scores for regular expressions matched to data and/or metadata associated with the particular data object.

8. The method of claim 1, further comprising: storing a plurality of sensitive data type definitions; wherein each respective sensitive data type definition defines a respective set of regular expressions for identifying data objects that satisfy the respective sensitive data type definition within a prescribed level of confidence, wherein the first set of one or more regular expressions is part of a sensitive data type definition applied to the set of data objects.

9. The method of claim 1, further comprising: generating respective confidence scores for each data object in the set of data objects; and performing the at least one operation on a subset of data objects in the set of data objects that have confidence scores that satisfy a threshold.

10. One or more non-transitory computer-readable media storing instructions which, when executed by one or more hardware processors, cause:

searching a set of data objects for data matching a first set of one or more regular expressions;

wherein the first set of one or more regular expressions include a generic regular expression and a set of one or more specific regular expressions that are associated with the generic regular expression;

generating a confidence score for a particular data object in the set of data objects as a function of regular expressions in the first set of one or more regular expressions that match data stored by the data object;

wherein generating the confidence score comprises:

matching the generic regular expression to data in the particular data object;

responsive to matching the generic regular expression, adjusting the confidence score to reflect a higher level of confidence that the particular data object includes sensitive data;

determining whether the set of one or more specific regular expressions match data from the particular data object, and for each specific regular expression that matches data from the particular data object, adjusting the confidence score to reflect a higher level of confidence that the particular data object includes sensitive data; and performing at least one operation to protect sensitive data stored in the particular data object based, at least in part, on the confidence score.

11. The media of claim 10, wherein the confidence score is further generated as a function of contextual information associated with the data object, wherein the contextual information identifies a group category for the data object.

12. The media of claim 10, wherein the confidence score is further generated as a function of security controls applied to the data object.

13. The media of claim 10, wherein at least one regular expression in the first set of one or more regular expressions is associated with a first weight, wherein at least one regular expression in the first set of one or more regular expressions is associated with a second weight, and wherein the confidence score is further generated as a function of the first weight and the second weight.

14. The media of claim 10, wherein the instructions further cause: identifying a sensitive data object that includes sensitive data; responsive to identifying the sensitive data object, generating at least one data regular expression and at least one metadata regular expression; wherein the at least one data regular expression is included in the first set of one or more regular expressions and the at least one metadata regular expression is included in a second set of one or more regular expressions.

15. The media of claim 10, wherein performing the at least one operation comprises: performing at least one of: applying a data masking script to at least the particular data object to mask the sensitive data, applying a data redaction policy on a document that includes the sensitive data if the confidence score satisfies a threshold, deleting the particular data object, triggering a compliance check on the particular data object, or encrypting the sensitive data within the data object based on the confidence score.

16. The media of claim 10, wherein the instructions further cause: receiving a set of discovery configurations that identify regular expressions and corresponding confidence scores; wherein the confidence score is generated by aggregating the corresponding confidence scores for regular expressions matched to data and/or metadata associated with the particular data object.

17. The media of claim 10, wherein the instructions further cause: storing a plurality of sensitive data type definitions; wherein each respective sensitive data type definition defines a respective set of regular expressions for identifying data objects that satisfy the respective sensitive data type definition within a prescribed level of confidence, wherein the first set of one or more regular expressions is part of a sensitive data type definition applied to the set of data objects.

18. The media of claim 10, wherein the instructions further cause: generating respective confidence scores for each data object in the set of data objects; and performing the at least one operation on a subset of data objects in the set of data objects that have confidence scores that satisfy a threshold.

19. The media of claim 10, further comprising: searching metadata associated with the set of data objects for metadata matching a second set of one or more regular expressions, wherein the confidence score is further generated as a function of regular expressions in the second set of one or more regular expressions that match metadata associated with the particular data object.

20. A system comprising:
one or more hardware processors;
one or more non-transitory computer-readable media storing instructions that, when executed by the one or more hardware processors, cause:
  searching a set of data objects for data matching a first set of one or more regular expressions;
  wherein the first set of one or more regular expressions include a generic regular expression and a set of one or more specific regular expressions that are associated with the generic regular expression;
  generating a confidence score for a particular data object in the set of data objects as a function of regular expressions in the first set of one or more regular expressions that match data stored by the data object;
  wherein generating the confidence score comprises:
    matching the generic regular expression to data in the particular data object;
    responsive to matching the generic regular expression, adjusting the confidence score to reflect a higher level of confidence that the particular data object includes sensitive data;
    determining whether the set of one or more specific regular expressions match data from the particular data object, and
    for each specific regular expression that matches data from the particular data object, adjusting the confidence score to reflect a higher level of confidence that the particular data object includes sensitive data; and
performing at least one operation to protect sensitive data stored in the particular data object based, at least in part, on the confidence score.

* * * * *